(12) United States Patent
Klug et al.

(10) Patent No.: US 7,643,817 B2
(45) Date of Patent: Jan. 5, 2010

(54) METHOD AND APPARATUS FOR RAPID SECURE SESSION ESTABLISHMENT ON HALF-DUPLEX AD-HOC GROUP VOICE CELLULAR NETWORK CHANNELS

(75) Inventors: Keith M. Klug, Mesa, AZ (US); Stuart S. Kreitzer, Coral Springs, FL (US); Brent M. McKay, Chandler, AZ (US); Bradley J. Rainbolt, Sunrise, FL (US); Fred R. Villa, Gilbert, AZ (US); Marc A. Boillot, Plantation, FL (US); Ty B. Lindteigen, Chandler, AZ (US); Bernard R. McKibben, Gilbert, AZ (US); William C. Neubauer, III, Gilbert, AZ (US); Jerry D. Ray, Phoenix, AZ (US); Michael A. Savage, Chandler, AZ (US); Bryce Sutherland, Gilbert, AZ (US); Barbara S. Winterfield, Mesa, AZ (US)

(73) Assignees: General Dynamics C4 Systems, Inc., Scottsdale, AZ (US); Motorola, Inc., Schaumburg, IL (US)

( * ) Notice: Subject to any disclaimer, the term of this patent is extended or adjusted under 35 U.S.C. 154(b) by 743 days.

(21) Appl. No.: 11/132,643

(22) Filed: May 18, 2005

(65) Prior Publication Data
US 2006/0281480 A1 Dec. 14, 2006

(51) Int. Cl.
*H04M 1/66* (2006.01)
*H04K 1/00* (2006.01)
(52) U.S. Cl. .................. 455/411; 455/518; 455/517

(58) Field of Classification Search .............. 455/411, 455/518, 519, 507, 517, 550.1, 410; 380/260, 380/270, 274, 247, 248, 249, 259, 283, 44; 713/155, 168, 169
See application file for complete search history.

(56) References Cited

U.S. PATENT DOCUMENTS

| | | | |
|---|---|---|---|
| 5,402,491 A * | 3/1995 | Locascio et al. | 380/273 |
| 5,768,380 A | 6/1998 | Rosauer et al. | |
| 6,477,150 B1 | 11/2002 | Maggenti et al. | |
| 6,477,387 B1 | 11/2002 | Jackson et al. | |
| 7,003,114 B1 * | 2/2006 | Mauro | 380/261 |
| 7,069,031 B2 * | 6/2006 | Maggenti et al. | 455/517 |
| 2002/0172364 A1 | 11/2002 | Mauro | |
| 2003/0012149 A1 | 1/2003 | Maggenti et al. | |
| 2005/0025315 A1 | 2/2005 | Kreitzer | |
| 2006/0123224 A1 * | 6/2006 | Klug et al. | 713/150 |

OTHER PUBLICATIONS

Bradley J. Rainbolt et al., U.S. Appl. No. 10/926,830, Crypto-Synchronization for Secure Communication, filed Aug. 26, 2004.
International Search Report for Application No. PCT/US06/16928 mailed on Oct. 16, 2008.
International Search Report for PCT/US06/17357 mailed Sep. 1, 2006.

* cited by examiner

*Primary Examiner*—Melur Ramakrishnaiah
(74) *Attorney, Agent, or Firm*—Ingrassia Fisher & Lorenz, P.C.

(57) ABSTRACT

Techniques are provided for secure group communications in a wireless dispatch system which includes a group of devices. The group of devices can include a first secure device which communicates with a plurality of second secure devices over a channel.

25 Claims, 9 Drawing Sheets

METHOD AND APPARATUS FOR RAPID SECURE SESSION ESTABLISHMENT ON HALF-DUPLEX AD-HOC GROUP VOICE CELLULAR NETWORK CHANNELS

TECHNICAL FIELD

The present invention generally relates to data communications and, more particularly, to systems and methods for providing secured data transmission in a half-duplex communications system.

BACKGROUND

Wireless and wireline telephone services typically provide point-to-point (or one-to one) service. By contrast, a group call (GC) or dispatching service can provide point-to-multipoint (or one-to-many service). These point-to-multipoint (PTM) communication systems can provide communications between a central location and multiple users of the system.

Many common communication protocols can provide dispatch services in which many users can allow another user in their group to communicate over a wireless channel to those users in a private communication group (PCG). Communication over the wireless channel can be accomplished via one of a variety of multiple access techniques which can include, but are not limited to, for example, time division multiple access (TDMA), frequency division multiple access (FDMA), and code division multiple access (CDMA). Common dispatch service applications include local police radio systems, taxi-cab dispatch systems, Federal Bureau of Investigation and secret service operations, and general military communication systems. For example, dispatch systems using Land Mobile Radios (LMRs) have been used in trucks, taxis, buses, and other vehicles in order to communicate information between a central dispatch center and group of members. Communications may be directed at a specific group member or to all group members simultaneously.

A group call service (GCS) may allow one user to talk to a group of users in a half-duplex or full-duplex mode. This typically allows one user of the group sole access to a dedicated channel. A GCS can be provided for quick, efficient, one-to-one or one-to-many (group) communication.

Push-to-Talk (PTT) Systems

One example of a GCS can be implemented as a wireless push-to-talk (PTT) dispatch system. PTT systems are typically used in a setting where a group of people, or members, require communications with each other in a PTM fashion. The group of people requiring communications with each other is commonly known as a "net," each member of the net sometimes referred to as a "net member." These systems can allow a talker to establish a radio connection to other active users in the talker's specific subscriber group. These systems may transparently dispatch the user's traffic information, such as voice and/or data, from the talker to the rest of the group or net members, who may be considered "listeners." The operation of PTT systems is similar to a "walkie-talkie." These PTT systems are often identified as having a "push-to-talk, release-to-listen" feature. As a result, the user does not need to go through a typical dialing and ringing sequence. Examples of push-to-talk applications can include workgroup communications, security communications, construction site communication, and localized military communications. These dispatch systems can allow for landline and wireless access to the system.

PTT services are typically half-duplex (in some cases semi-duplex). As such, only one member may typically transmit information to the other members at any given time. Members desiring to transmit to other members of the system typically send an access request by depressing a PTT button on their communication device while talking and then release it when they are done. By doing so, the user's device sends a service request which requests permission from the network to use a reverse link transmission channel. This service request triggers a radio or a server, which indicates the user's request for the "floor." When the service request is granted, the communication channel is effectively reversed so that the talking user can send information over the same communication channel the user was previously receiving on. The talking user's voice is routed from the reverse link to telephony infrastructure and broadcast to other group or net members over the forward link. Typically, a dedicated channel can be used to transmit communications from one member to multiple other group or net members simultaneously. The dedicated channel may comprise a single channel or frequency, or a group of individual channels managed by a controller to imitate the single channel.

Each user monitors a common broadcast forward link signal. Each user can also listen to the dedicated broadcast channel to receive communications from the single member who is transmitting.

After the voice connection has been established, the talking user can talk for a while and the other users listen on the channel. If another group or net member attempts to transmit over the broadcast channel while another member is transmitting, that member will receive an audible "busy" signal indicating the channel is already taken. Likewise, if two group or net members attempt to simultaneously transmit to an idle channel, the infrastructure only assigns one of the members the resource/floor, and the other member receives the audible "busy" signal until the PTT is released, at which point voice reception occurs Listening users may request the floor by pressing their PTT button to respond. This way the system knows which direction the signal should be traveling in. The permission to talk may be moderated by the infrastructure and the network can either reject the request or allocate the requested resources on the basis of predetermined criteria, such as the availability of resources, priority of the requesting user, etc. A user can belong to many groups at a same time. As such, the communications system should be able to select and prioritize the group the user listens to if there are multiple group communications to the user occur at the same time.

Secure Communications

Encryption of end-to-end communication is an increasingly important feature, particularly for wireless communication devices. Data networks can use cryptographic techniques to transmit data securely from one location in a network to another location in the network.

Encryption can be applied to voice as well as data. Typically, a device connected to the network encrypts data using a cipher or encryption algorithm and an encryption key. Using voice as an example, a secret encryption key can be used to encode voice on the source handset using the encryption algorithm. The encrypted voice stream can then be transmitted securely over a cellular communication system to a destination or target device. In order to decode the encrypted voice stream, the destination device must use the same secret encryption key that was used to encrypt the voice stream and apply a cipher or decryption algorithm.

In symmetric or "secret-key" type cryptographic systems, symmetric key algorithms use identical encryption and decryption keys are used to encrypt and decrypt the data.

Thus, to exchange enciphered data a single key value must be shared between the originator and the recipient and protected by both parties.

In asymmetric or "public-key" type cryptographic systems, asymmetric key exchange (AKE) algorithms use separate public and private keys. Existing asymmetric key exchange algorithms include, for example, Diffie-Hellman, Rivest, Shamir, and Adelman (RSA), Digital Signature Algorithm (DSA), ElGamal, and Elliptic Curve Cryptography (ECC). In such asymmetric cryptographic systems, a single operation is used to generate the pair of public and private keys. The public key can be made publicly available and can be safely shared with everyone including the other party to a secure communication. The private key is kept secure or secret by the individual who generated the key pair. To exchange encrypted data each party to the exchange makes their public key available, and keeps their private key secret. The keys are typically different from each other, but neither key can be deduced from the other. Because the private key needs to be kept only by one party, it never needs to be transmitted over any potentially compromised networks.

Two sides of a communication session generate symmetric private keys through the exchange of public keys. The two sides agree beforehand on the exact algorithm to use, and each side then selects a random number as a private key and uses the algorithm and the random number to generate a public key. The two sides exchange public keys and then each generates a session key using their own private key and the other side's public key. Even though neither side knows the other side's private key, both sides' session keys are identical. Data enciphered by using one key of the pair may be deciphered using the other key of the pair. The originator of an exchange enciphers the data using the public key of the recipient. The recipient is then able to decipher the received data using his own private key. A third party intercepting the public keys but lacking knowledge of either private key cannot generate a session key. Therefore, data can be securely encrypted with the session key. An asymmetric key pair may remain unchanged over many sessions. Because one key pair is associated with one party, even on a large network, the total number of required keys is much smaller than in the symmetric case.

Although AKE methods are convenient compared with alternatives such as manual key loaders, they are relatively slow as a result of being computationally intensive and because of the large keys needed for good security. To avoid this speed penalty, most secure devices use AKE only to establish the public key (shared by both sides) and then revert to fast symmetric-key encryption algorithm such as DES or AES to encrypt and decrypt the traffic.

Call set-up refers to the time elapsed between pressing the send or push-to-talk button and the call connecting to a secure traffic channel. Because AKE is relatively slow on wireless devices, it noticeably delays call setup. Excessive set-up time is particularly harmful to the user experience on dispatch calls which are bursty in nature and are adversely affected by even small set-up delays.

Conventional PTT cellular services provide network enabled security over the air link between the mobile and the network. By contrast, in trunked radio dispatch systems, users are provided with pre-placed or pre-loaded keys that can be used to encrypt voice. In the context of AKE schemes applied to other wireless communication systems, such as full duplex point-to-point cellular systems, once a shared symmetric key has been used, that shared, symmetric key is typically discarded and a new shared, symmetric key is generated the next time a user wants a secure communication session.

There is a need for PTT-type systems which can enable end-to-end security for group calls between mobile PTT clients. It would be desirable to provide techniques which allow end-to-end security to be applied to ad-hoc group PTT calls where the group member list is defined and controlled by the user requesting the secure group call. In addition, it is desirable if such systems could avoid unnecessary key exchanges to reduce or eliminate call set-up delays typically associated with establishing such secure communications. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will be described in conjunction with the following drawing figures, wherein like numerals denote like elements.

DETAILED DESCRIPTION

Figure 1:
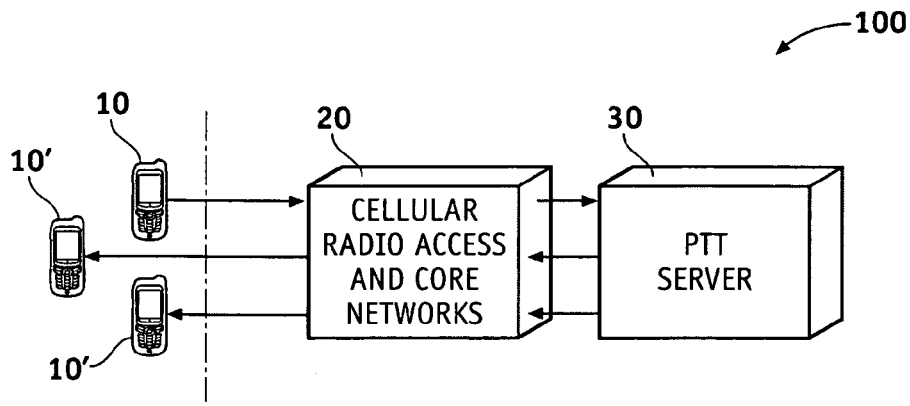
FIG. 1 is a block diagram of a generic PTT wireless communication system that can provide secure communications between two users.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

DEFINITIONS

An initiating secure device is used herein to refer to a secure device that initiates a secure communication with a group of listening devices. A listening secure device is used herein to refer to a secure device that receives communications from the initiating secure device. It should be appreciated that the term "secure device" can generally refer to a wireless communication device or other hardware with which an access network communicates. A secure device may be mobile or stationary and can include devices that communicate through a wireless channel or through a wired channel. A secure device may further be any of a number of types of devices including but not limited to PC card, compact flash, external dr internal modem, wireless or wireline phone, or personal digital assistant (PDA). A secure device may be a mobile telephone which includes a mobile telephone handset, also called mobile equipment (ME), and a memory module, such as a physically secure integrated circuit card or smart card called UICC, which may be removable or permanently attached to the ME. In a Global System for Mobile communication (GSM) telephone, the UICC is typically a Subscriber Identity Module (SIM). In a code division multiple access (CDMA) telephone, the UICC is typically a removable user identity module (RUIM).

Call Setup Encryption (CSE) is used herein to refer to a method of encrypting portions of asymmetric key exchange messages with a shared secret known to an initiating device and a listening device as a way of providing authentication of corresponding client identity.

Push-To-Talk (PTT) voice is used herein to refer to a half-duplex voice operation in which an initiating device can request a voice channel via a PTT button and wait for an access grant before placing voice on a PTT channel to a listening device. Although the operation of the service is half-duplex, full duplex cellular traffic channels may be used to implement the service.

A Key Encryption Key (KEK) is used herein to refer to asymmetric keys used to encrypt and decrypt a traffic encryption key and supporting cryptographic parameters.

A Security Association (SA) is used herein to refer to a set of mutually agreed upon security parameters between two clients or parties, such as, between an initiating device and a listening device. A security association can be used to encrypt and decrypt the traffic between the parties. The security association between an initiating device and a listening device is established via an encrypted group TEK distribution from the initiating device to each of the listening devices. Parameters included in a SA comprise a group member list (GML) with client IDs, a group Traffic Encryption Key (TEK), and a unique TEK state vector sent to each listening device. A group Traffic Encryption Key (TEK) is used herein to refer to a symmetric key used to encrypt and decrypt the PTT voice/data traffic stream being sent between an initiating device and a list of listening devices associated with a secure group PTT call.

A point-to-point communication refers to a communication between an initiating device and a listening device over a dedicated channel. By contrast, a broadcast or point-to-multipoint communication refers to a communication between an initiating device and group of listening devices over a common channel. The term dedicated channel refers to a channel modulated by information specific to an individual secure device. The term common channel refers to a channel modulated by information shared among all secure devices in a group.

Overview

Embodiments of the present invention provide methods and apparatus that allow for secure group communications in a half-duplex wireless dispatch system, such as a PTT system. End-to-end security techniques are provided wireless network architectures which implement half-duplex, group voice calls on cellular PTT channels. These methods and apparatus can help to quickly establish secure statically defined group calls and ad-hoc defined group calls in cellular based PTT systems. Security association establishment is expedited via the use of cached group traffic encryption keys (TEKs), yielding fast secure call set up performance. This supports the fast connect objectives of push-to-talk systems. The existing cellular infrastructure does not need to be changed to support these end-to-end security techniques. In fact, because security is independent of the network, the same group traffic encryption key (TEK) can be used in different wireless communication systems which can allow a user to switch between CDMA, TDMA, etc.

In one implementation, techniques are provided for secure group communications in a half-duplex wireless dispatch system which includes a group of devices. The group of devices can include a first secure device which communicates with a plurality of second secure devices over a half-duplex PTT voice channel. The first secure device creates a group member list which includes the first secure device and the second secure devices. The first secure device generates or retrieves a group traffic encryption key. Unique key encryption keys can be established by the first secure device for each of the plurality of second secure devices via an asymmetric key exchange between the first secure device and the second secure devices during a first session. Each unique KEK has a corresponding unique private key which corresponds to the unique KEK for that particular second device. The first secure device generates a unique state vector for each of the plurality of second secure devices. Each unique state vector corresponds to a particular one of the plurality of second secure devices. The first secure device also has a first unique state vector. The first secure device encrypts the group member list, the group TEK and each unique state vector for each of the particular second secure device using the corresponding unique KEKs of each of the particular second secure devices to generate a unique encrypted message for each of the plurality of second secure devices, and sends each of the unique encrypted message to the particular second secure device that unique encrypted message corresponds to. Each unique encrypted message can be decrypted at its corresponding one of the second secure devices using the corresponding unique private key which corresponds to the unique KEK of that particular second secure device. Decryption of the unique encrypted messages by each of the second secure devices generates the group member list, the group TEK and the unique state vector for that particular second secure device. The group TEK can be stored in the secure devices of the group members for use during a second session between the group members to expedite group TEK establishment during call set-up of the second session.

Exemplary Wireless PTT Communication System

In the wireless PTT communication systems shown in FIGS. 1-5 below, the initiating secure device is denoted with the reference numeral 10, whereas the listening secure devices are denoted with the reference numerals 10', 10'' and 10'''.

FIG. 1 is a block diagram of a generic PTT wireless communication system 100 that can provide secure communications between two users. This system includes secure group secure devices 10, 10', cellular network infrastructure 20 and a PTT server 30. The PTT wireless communication system 100 is sometimes also referred to as a push-to-talk (PTT) system, a net broadcast service (NBS), a dispatch system; or a point-to-multi-point communication system.

Each secure device 10, 10' supports the cellular air interface and call/session processing functions as well as a PTT client application compatible with the PTT server 30 used in the network. Each secure device 10, 10' includes a PTT client that operates in conjunction with the PTT server 30 in order to execute half-duplex service. Each secure device 10, 10' supports cryptographic algorithms and asymmetric key exchange message processing used to establish a TEK between secure cellular PTT mobile devices. Each secure device 10, 10' encrypts and decrypts voice per the security association. Each secure device 10, 10' also formats encrypted voice and cryptographic synchronization maintenance messages within the PTT channel structure used on the cellular air interface.

The cellular infrastructure 20 establishes network traffic channels between the secure device 10 and the PTT server 30. The cellular infrastructure 20 performs a variety of functions which include, but are not limited to, subscriber access control, mobility management, subscription management, radio resource management, and connection management and call/session processing. In some implementations, the cellular infrastructure 20 generally comprises a radio access network (RAN) and a core network (CN). Examples of such implementations are discussed below with reference to FIGS. 3 and 4.

The PTT server 30 manages the PTT channel half-duplex control mechanism amongst the PTT users, provides call/session processing with PTT clients, and replicates and forwards PTT voice packets to PTT users. The PTT server 30 may be deployed in either a centralized deployment or a regionalized deployment. The manner in which the PTT server 30 is implemented depends on the type of cellular infrastructure 20.

As will be explained in greater detail below with reference to FIGS. 2-5, the present invention can be applied to a wide variety of wireless and wired communication systems some of which are used to implement PTT services. These embodiments include, for example, PTT over voice circuit service channels, PTT over VoIP packet service channels, PTT over iDEN voice dispatch channels and PTT over peer-to-peer networks. Various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, GSM standard, all of which are incorporated by reference herein in their entirety. Each embodiment of the PTT wireless communication system 100 can be distinguished, for example, based on their different cellular infrastructures 20, traffic channel structures and call/session processing sequences. Nevertheless, it should be appreciated that the present invention applies to each embodiment of the PTT wireless communication system 100.

Figure 2:
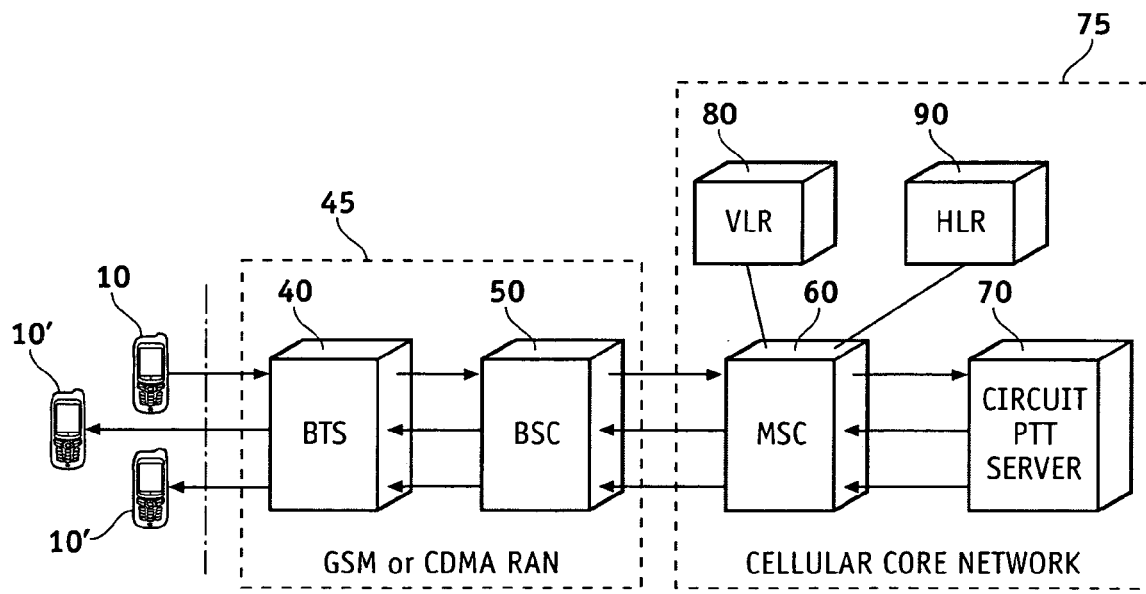
FIG. 2 is a block diagram of a secure push-to-talk (PTT) wireless communication system that carries circuit switched voice traffic between an initiating device and a listening device via circuit switched voice channels.

FIG. 2 is a block diagram of a secure push-to-talk (PTT) wireless communication system which carries circuit switched voice traffic via circuit switched voice channels. The communication system 100 may be for communications of data and voice.

The system shown in FIG. 2 includes circuit-based secure devices 10, 10', a GSM or CDMA radio access network (RAN) 45, and a circuit-based PTT cellular core network 75. This embodiment would apply to both GSM and CDMA radio access networks (RANs). A CDMA system as referred to herein may include the family of CDMA systems, including CDMA2000, W-CDMA, and IS-95.

The GSM or CDMA radio access network (RAN) 45 includes a collection of base transceiver stations (BTS) 40 and one or more base stations' controllers (BSC) 50. The RAN 45 transports data packets between multiple secure devices 10. The RAN 45 may be further connected to additional networks outside the RAN 45, such as a corporate intranet or the Internet, and may transport data packets between each secure device 10 and such outside networks.

The base transceiver station (BTS) 40 provides communication links between a number of secure devices 10 and a public switched telephone and data network (not shown). It should be noted that the BTS 40 may be referred to as Node B in WCDMA and UMTS systems. Therefore, such terms may be used interchangeably. BTS/Node B 40 may include a number of components, such as a base transceiver system and antenna system. For simplicity, such components are not shown. The term base transceiver station (BTS) 40 is used herein to mean the hardware with which secure device 10 communicate. Cell refers to the hardware or a geographic coverage area, depending on the context in which the term is used. A sector is a partition of a cell. Because a sector has the attributes of a cell, the teachings described in terms of cells are readily extended to sectors.

The BSC 50 may control various operating aspects of the communication system 100 in relation to communications over a back-haul between the cellular core network 75 and BTS/Node B 40. The BSC 50 may also be referred to as radio network controller (RNC) in various standards.

The secure device 10 may communicate with one or more BTSs 40 by transmitting and receiving data packets through one or more BTSs 40. A secure device 10 that has established an active traffic channel connection with one or more BTSs 40 is called an active mobile station, and is said to be in a traffic state. A secure device 10 that is in the process of establishing an active traffic channel connection with one or more BTSs 40 is said to be in a connection setup state. A secure device 10 that is powered on and capable of receiving signals from a BTS 40 but is not in a traffic state or in a connection setup state is said to be in an idle state. It should be noted that the PTT phone 10 may be referred to as user equipment (UE). Therefore, such terms may be used interchangeably.

A communication link through which a secure device 10 sends signals to a BTS 40 is called a reverse link or uplink. The term communication channel/link is used herein to mean a physical channel or a logical channel in accordance with the context. A communication link through which a BTS 40 sends signals to a secure device 10 is called a forward link or uplink. BTS/Node B 40 may communicate with each secure device 10 that is in its coverage area via a forward link signal transmitted from BS/Node B 40. The forward link signals targeted for secure device 10 may be summed to form the forward link signal. Each of the secure devices 10 receiving the forward link signal decodes the forward link signal to extract its intended received information. BTS/Node B 40 may also communicate with the secure devices 10 that are in its coverage area via a forward link signal transmitted from BTS/Node B 40. The secure devices 10 communicate with BTS/Node B 40 via corresponding reverse links. Each reverse link is maintained by a reverse link signal. Although the reverse link signals may be targeted for one BTS/Node B 40, may also be received at another BTS/Node B 40.

The circuit-based PTT cellular core network 75 includes a Mobile Switching Center (MSC) 60 coupled to a circuit PTT server 70. In addition, a Visitor Location Register (VLR) 80 and a Home Location Register (HLR) 90 are coupled to the MSC 60.

Secure Group Circuit PTT Voice Call

For secure circuit PTT voice, a secure device 10 uses GSM or IS-41 call processing to establish circuit voice channels with the circuit PTT server 70. This traffic channel can use either Tandem Free Operation (TFO) or Transcoder Free Operation (TRFO) to preserve cryptographic integrity. The secure group secure devices 10 format encrypted voice and cryptographic synchronization messages within the circuit voice channel, which are then forwarded to the recipient secure group secure device 10 by the circuit PTT server 70.

Figure 3:
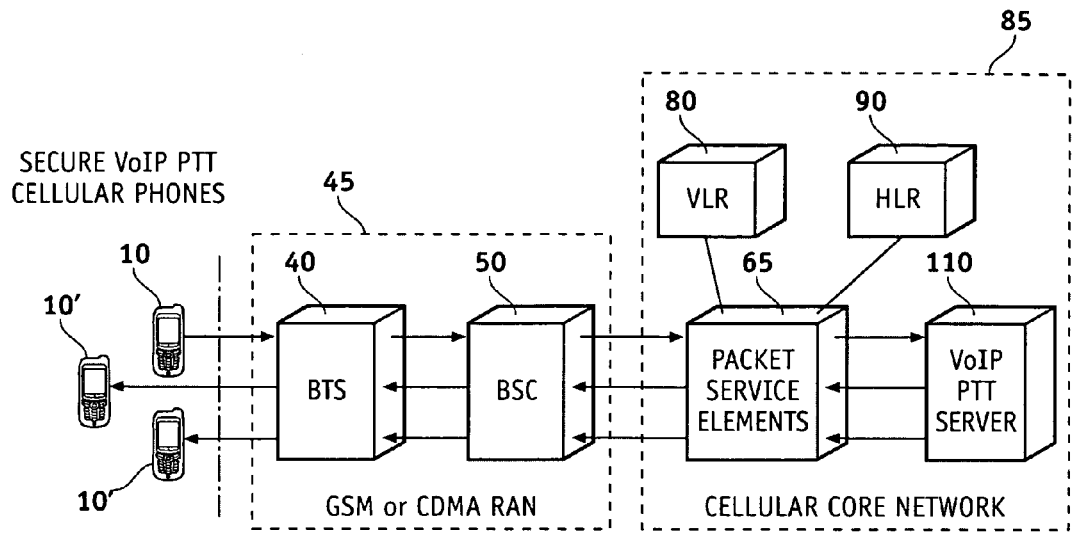
FIG. 3 is a block diagram of a secure group PTT wireless communication system that carries packet switched voice traffic between an initiating device and a listening device via packet switched voice-over-IP (VoIP) channels.

FIG. 3 is a block diagram of a secure voice-over-IP (Internet Protocol) or VoIP PTT wireless communication system that carries packet switched voice traffic via packet switched voice-over-IP (VoIP) channels. This embodiment can apply to radio access networks (RANs) and core networks 85 which implement features from GPRS, EDGE, WCDMA, CDMA1X, CDMA EV-DO, CDMA EV-DV standards, as well as the Push to Talk over Cellular (POC) standard as standardized by the Open Mobile Alliance (OMA).

The secure voice-over-IP (VoIP) PTT wireless communication system 100 shown in FIG. 3 includes circuit-based secure devices 10, 10', a GPRS or CDMA 1x radio access network (RAN) 45, and packet-based PTT cellular core network 85. The circuit-based secure devices 10 and radio access network (RAN) 45 are similar to those described above in conjunction with FIG. 3. For sake of simplicity these subsystems will not be described again.

In this embodiment, the core network 85 includes packet service elements 65 coupled to a VoIP PTT server 110. In addition, a Visitor Location Register (VLR) 80 and a Home Location Register (HLR) 90 are coupled to the packet service elements 65.

The VoIP PTT server 110 may be implemented as an OMA, 3GPP or 3GPP2 compliant PTT server, or may be implemented as a custom server. Regardless of the implementation, the VoIP PTT server 110 should provide IP address resolution, packet routing functionality and RTP payload replication functionality.

When implemented in a GPRS network, the packet service elements 65 include, for example, a Serving GPRS Service Node (SGSN) and a Gateway GPRS Service Node (GSGN). When implemented in a CDMA 1x network, the packet service elements 65 include, for example, a Packet Data Serving Node (PDSN). For sake of simplicity, a secure voice-over-IP (VoIP) PTT wireless communication system that carries packet switched voice traffic via packet switched voice-over-IP (VoIP) channels will now be described with respect to radio access networks (RANs) and cellular core networks 85 which implement features from a CDMA 1x network.

The secure devices 10, 10' may request packet data sessions using a data service option. Each secure device 10, 10' may use the session to register its Internet Protocol (IP) address with a group call server which performs group call initiations. In this embodiment, VoIP PTT server 110 is connected to the service provider's packet data service nodes (PDSNs) through a service provider's wide area network. Upon requesting a packet data session from the infrastructure 20, the secure devices 10, 10' may have IP connectivity to the VoIP PTT server 110 through a packet data serving node (PDSN). The PDSN provides an interface between transmission of data in the fixed network and the transmission of data over the air interface. Each PDSN may interface to a BSC 50 through a packet control function (PCF) which may be co-located with the BSC 50 within the BTS 40. The PDSN may be in an active or connected state, dormant state, or a null/inactive state. In the active or connected state, an active traffic channel exists between the participating secure device 10 and the BTS 40 or BSC 50, and either side may send data. In the dormant state, no active traffic channel exists between the participating secure device 10 and the BSC 50, but a point-to-point (PPP) link is maintained between the participating secure device 10 and the PDSN. In the null or inactive state, there is no active traffic channel between the participating secure device 10 and the BSC 50, and no PPP link is maintained between the participating secure device 10 and the PDSN.

After powering up, the secure device 10 may request packet data sessions. As part of establishing a packet data session, the secure device 10 may be assigned an IP address. The secure device 10 may perform a registration process to notify the PTT server 30 of the secure device's 10 IP address. Registration may be performed using an IP protocol, such as session initiation protocol (SIP) over user datagram protocol (UDP). The IP address of the secure device 10 may be used to contact the secure device 10 when the corresponding user is invited into a group call.

Once a group call is established, secure devices 10 and the VoIP PTT server 110 may exchange media and signaling messages. In one embodiment, media may be exchanged between the participating secure devices 10 and the VoIP PTT server 110 by using real-time protocol (RTP) over UDP. The signaling messages may also be exchanged by using a signaling protocol over UDP.

Secure Group VoIP Cellular PTT Voice Call

For secure VoIP cellular PTT voice, the secure group secure devices 10 uses GPRS or CDMA1x session processing to establish packet traffic channels to the VoIP PTT server 110. The secure group secure devices 10 format encrypted voice and cryptographic synchronization messages within RTP payloads compatible with payload formats of the VoIP PTT server 110. The VoIP PTT server 110 then forwards the RTP payloads to the recipient secure group secure devices 10. These formats accommodate the half-duplex flow control methods employed by the VoIP PTT server 110.

Figure 4:
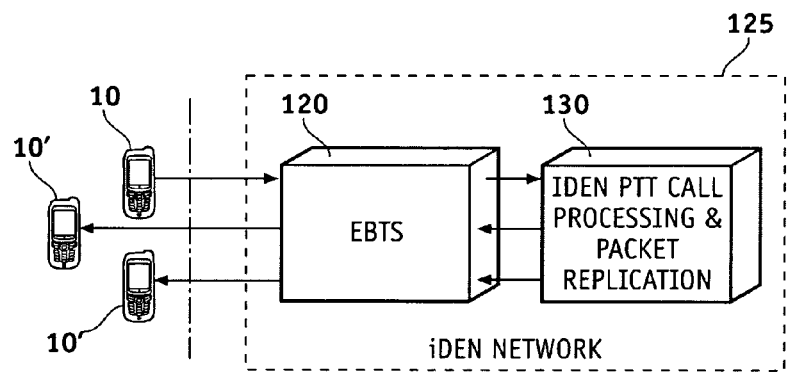
FIG. 4 is a block diagram of a secure group PTT wireless communication system that carries voice traffic between an initiating device and a listening device via iDEN dispatch channels.

FIG. 4 is a block diagram of a secure integrated Digital Enhanced Network (iDEN) PTT wireless communication system that carries voice traffic via iDEN voice dispatch channels implemented in iDEN infrastructure networks. The secure iDEN PTT wireless communication system 100 includes secure iDEN PTT phones 10 and an iDEN network 125. The iDEN network 125 includes an Enhanced Base Transceiver Station (EBTS) 120 and an iDEN PTT call processing and packet replication infrastructure 130. The iDEN PTT call processing and packet replication infrastructure 130 is responsible for the overall coordination of Dispatch communication including subscriber provisioning, mobility information, dispatch call setup, routing of voice dispatch packets for point to point service, and packet duplication and routing for Group Call services.

Secure Group PTT Voice Over iDEN Dispatch Voice Channels

For secure group PTT voice over iDEN dispatch voice channels, the secure iDEN PTT phones 10, 10' uses iDEN call processing and network access procedures to establish packet traffic channels to the iDEN PTT call processing and packet dispatch packet replication infrastructure 130. The secure iDEN PTT phones 10, 10' format encrypted voice and cryptographic synchronization messages within the iDEN voice dispatch channels. The iDEN PTT call processing and packet replication infrastructure 130 then forwards the encrypted voice packets to the recipient Enhanced Base Transceiver Station (EBTS) and secure iDEN PTT phones 10, 10'.

Figure 5:
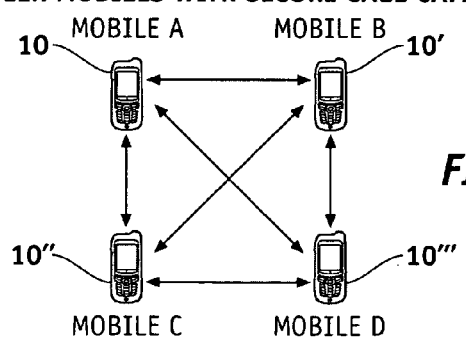
FIG. 5 is a block diagram of a secure group PTT wireless communication system that carries voice traffic between an initiating device and a listening device via dispatch channels in a peer-to-peer network.

FIG. 5 is a block diagram of a secure peer-to-peer PTT wireless communication system that carries voice traffic via dispatch channels in the absence of cellular infrastructure. Peer-to-peer networks such as iDEN MotoTalk feature, peer-to-peer wireless LANs, and Mobile Ad-Hoc Networks (MA-NETs) do not use a cellular infrastructure. Rather, in these systems, each PTT phone 10 communicates directly with other PTT phones 10', 10", 10'''. Each PTT phone 10 has access to a common air interface which exists within the range of other PTT phones 10', 10", 10'''. Since there is no infrastructure providing master timing, each peer to peer transmission contains all of the necessary synchronization and timing information. Such peer to peer systems may also use techniques such as frequency hoping to enhance detection and increase eavesdropping resistance. Collision avoidance techniques are required since any PTT phone 10 may transmit over the air interface simultaneously with other PTT phones 10', 10", 10'''. Furthermore, multiple PTT phones 10, 10', 10", 10''' may detect received traffic from a transmitter even if it is not specifically addressed to that PTT phone 10, 10', 10", 10'''. As such, each PTT phone 10, 10', 10", 10''' mutes/ignores all traffic on the channel that is not addressed to its address. CSE via a shared secret by the two PTT phones 10, 10', 10", 10''' is required for authentication and also to prevent man in the middle attacks by other PTT phones 10, 10', 10", 10''' that are also active on the common air interface.

Each cellular embodiment described above uses a unique PTT channel structure. Therefore, a distinct formatting function is used by the secure group secure devices 10, 10' based upon the cellular network types illustrated in FIGS. 1-5. Nevertheless, the embodiments of the invention can be applied, for example, to all the PTT embodiments discussed above with respect to FIGS. 1-5. It should also be appreciated that the secured packets pass through the cellular infrastructure to the PTT servers transparent to the mobile network. The PTT servers replicate the encrypted voice packets without transcoding or other content manipulation. To preserve cryptographic integrity, in the GSM type networks, Transcoder Free Operation (TFO) or TrFO features would be used, whereas in CDMA type networks a transcoder free feature would be used for secure circuit voice channels.

EXEMPLARY EMBODIMENTS

Figures 6, 7:
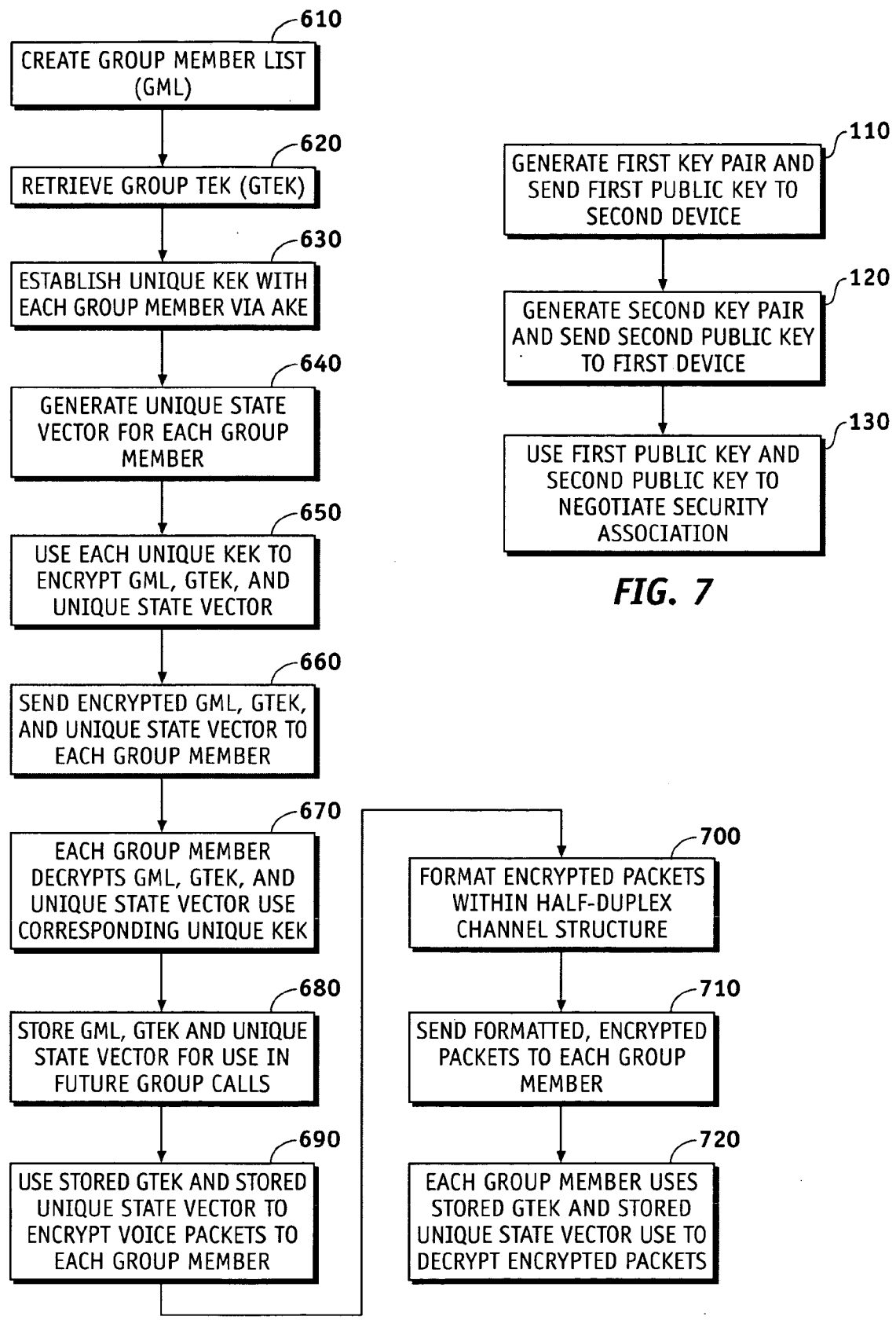
FIG. 6 is a flow chart showing an exemplary method for secure group communications for a half-duplex wireless dispatch system.
FIG. 7 is a flow chart showing an exemplary method of establishing a security association between an initiating device and a listening device via an asymmetric key exchange messages.

FIG. 6 is a flow chart showing an exemplary method for secure group communications for a half-duplex wireless dispatch system. This method can be organized into three major sub-processes. The first sub-process is shown in steps 610 through 670, and relates to distributing the secure group PTT call group TEK to each secure group PTT call member. The second sub-process is shown at step 680 and relates to storing of the group TEK by each secure group PTT call member. The third sub-process is shown at step 690 and relates to using the group TEK to encrypt/decrypt voice packets and format them within half duplex PTT channel structures. Cryptographic synchronization messages are also applied to the half duplex PTT channel structures to maintain secure call synchronization.

Here the group members include an initiating secure device 10 which communicates with a plurality of listening secure devices 10' over a half-duplex PTT voice channel. The initiating secure device 10 is the initiator of the first group communication session, however, the initiating secure device 10 may become a "listening" device or may remain as the initiating secure device 10 during a subsequent session. Likewise, plurality of listening secure devices 10' are the recipients of communications from the initiating secure device 10 during the first group communication session, however, one of the listening secure devices 10' may remain as a "listening" device or may become the initiating secure device 10 during a subsequent session.

At step 610, the initiating secure device 10 creates a secure group PTT call group member list (GML) that includes initiating secure device 10 and the listening secure devices 10' which the initiating secure device 10 wants to include in the group. At step 620, the initiating secure device 10 generates or retrieves a group traffic encryption key (TEK) for the secure group PTT call.

At step 630, a unique key encryption key (KEK) for each of the plurality of listening secure devices 10' is generated via an asymmetric key exchange between the initiating secure device 10 and one of listening secure devices 10'. Each unique KEK has a corresponding unique private key which corresponds to the unique KEK for that particular listening device. A separate asymmetric key exchange is completed between the secure group PTT initiator 10 and each secure PTT group call recipient 10' to establish a unique KEK between the initiating secure device 10 and each particular listening secure device 10'. As discussed below, the KEK can then be used to encrypt the group TEK, group member list and a unique group member state vector when transmitted that is transmitted to each group member.

FIG. 7 is a flow chart showing an exemplary method of establishing a unique KEK and its corresponding unique private key between an initiating device 10 and one of the listening secure devices 10' via an asymmetric key exchange messages. At step 110, a first public/private key pair is generated at the initiating secure device 10 and the first public key can be sent to the listening secure device 10', for example, over a network transport service. At step 120, a second public/private key pair can be generated at the listening secure device 10' and the second public key can be sent to the initiating secure device 10 over the network transport service. At step 130, the first public key and the second public key can be used to create the KEK as discussed in greater detail below with reference to FIG. 8.

Returning now to FIG. 6, at step 640, the initiating secure device 10 generates a unique state vector (SVn) for each of the listening secure devices 10'. Each unique state vector corresponds to a particular one of the listening secure devices 10'. The initiating device 10 also has a first unique state vector.

At step 650, the initiating secure device 10 encrypts the GML, the group TEK and each unique state vector (SVn) assigned to each of the particular listening devices 10' using the corresponding unique KEKs assigned to each of the particular listening secure devices 10'. This encryption produces a unique encrypted message for each of the listening secure devices 10'. Each unique encrypted message corresponds to a particular one of the listening secure devices 10'. This process is repeated for each secure group member.

At step 660, the initiating secure device 10 distributes or sends each of the unique encrypted message to each of the corresponding particular listening device 10'. The initiating secure device 10 distributes the secure group PTT call GML and the group TEK to each secure group PTT member over a secure link established per user. The initiator 10 also distributes a state vector unique to each one of the listening secure devices 10' to ensure that the same State Vector counter sequence is not repeated amongst the listening secure devices 10'. The secure link can be established over a variety of reliable network resources. Examples of the reliable network transport service can include, for example, a reliable signaling plane network services, such as GSM Unrestricted Supplementary Service Data (USSD), Packet cellular IP service, a reliable security application over UDP/IP or TCP/IP, a reliable security application over short message service and enhanced short message service, a reliable security application over multi-media message or instant messaging services, a mobile to mobile full duplex circuit data calls, or voice payloads which carry a reliable transport.

At step 670, each of the listening secure devices 10' decrypts their unique encrypted message. Each of the particular listening secure devices 10' uses its corresponding private key, which corresponds to the unique KEK of that particular listening device 10', to decrypt the unique encrypted message of that particular listening device 10'. This decryption generates the GML, the group TEK and the unique state vector for that particular listening device 10'.

At step 680, each of the listening secure devices 10' stores or caches the group TEK, group call member list and their assigned unique state vector for use during a second session (or secure PTT group call) between the group members to expedite group encryption key establishment during call set-up of the second session. Each secure group PTT call member caches the group TEK.

After some time passes one of the secure devices 10, 10' of one of the group members sends a secure call request to the network. The second session between the group members can then be established during call set-up of the second session using the TEK from the first session and the unique state vector of the secure device.

During this second session, at step 690, the stored group TEK can be used to encrypt voice packets being sent from the new initiating secure device 10 to the new listening secure devices 10'. The new initiating secure device 10 of the second session can be the secure device of any of the group members including the original initiating secure device 10 or the original listening secure devices 10'. The group TEK is applied to the group PTT voice at the mobile devices. Typical vocoded voice frames on the group PTT voice channel are replaced with encrypted voice packets and sync management messages needed to maintain cryptographic synchronization, including the member state vector. This encryption will be described in greater detail below with reference to FIG. 12.

At step 700, the encrypted packets are formatted to fit within a half-duplex channel structure.

At step 710, the formatted, encrypted packets are transmitted to each of the new listening secure devices 10'.

At step 720, the new listening secure devices 10' in the second session can use the stored group TEK and the unique state vector to decrypt voice packets received from the new initiating secure device 10'. The new listening secure devices 10' detect cryptographic synchronization data on the group call in order to distinguish it from clear voice and to establish cryptographic synchronization. This decryption will be described in greater detail below with reference to FIG. 13.

Figure 8:
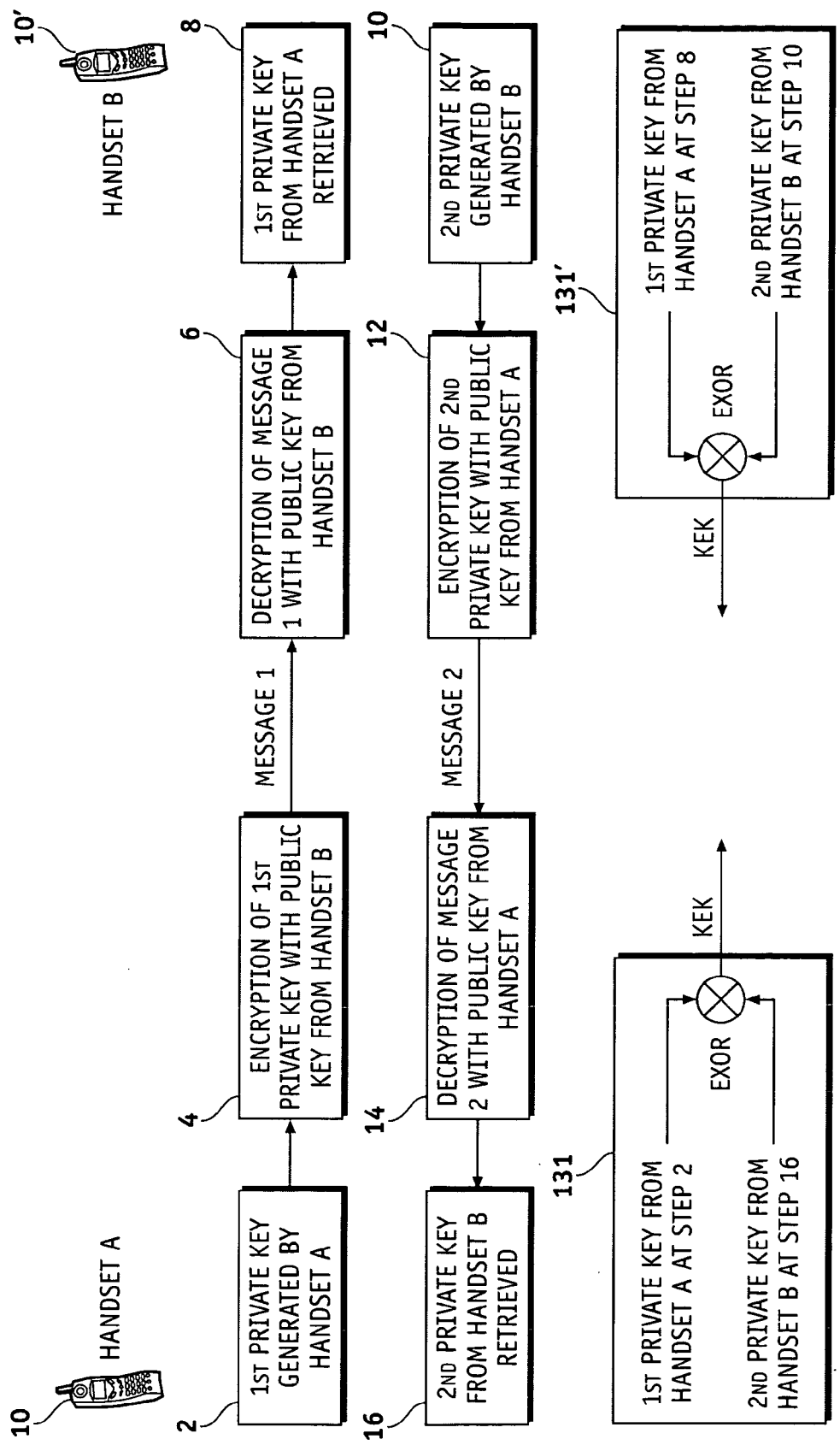
FIG. 8 is a call flow diagram which illustrates an exemplary process for generating a Key Encryption Key (KEK) used for secure communications between an initiating device and a listening device.

FIG. 8 is a call flow diagram which illustrates an exemplary process for generating a unique Key Encryption Key (KEK) used for secure communications between an initiating secure device 10 and one of the listening secure device 10' on the group member list. This process is performed for each listening secure device 10' in the group member list until every listening secure device 10' has its own unique KEK.

Each of the devices 10, 10' randomly generate a public key and a private key. The private key is typically generated by a random number generator in the device 10, 10'. For example, the initiating secure device 10 can generate a first public/private key pair in, and the listening device 10' can generate a second public/private key pair. Both devices 10, 10' allow everyone access to their public key.

At step 2, initiating secure device 10 generates a first private key to send to listening secure device 10'. At step 4, initiating secure device 10 encrypts the first private key using an appropriate asymmetric algorithm and the second public key generated by listening secure device 10'. The initiating secure device 10 then sends the resulting message 1 to listening secure device 10'. At step 6, using its own second public key, the listening secure device 10' decrypts message 1 received from initiating secure device 10. At step 8, the first private key from initiating secure device 10 can be retrieved by the listening secure device 10'. At step 10, the listening secure device 10' generates a second private key to send to the initiating secure device 10. At step 12, the listening secure device 10' encrypts the second private key using an appropriate asymmetric algorithm and the first public key generated by initiating secure device 10. The listening secure device 10' then sends message 2 to the initiating secure device 10. At step 14, using its own first public key, the initiating secure device 10 decrypts message 2 received from the listening secure device 10', and at step 16, the second private key from listening secure device 10' can be retrieved.

The initiating secure device 10 and the listening secure device 10' both use the first public key and the second public key to generate the unique KEK between the initiating secure device 10 and the listening secure device 10' for the first session. For example, the initiating secure device 10 can generate the unique KEK by exclusively or-ing (EXOR) the first private key generated by the initiating secure device 10 at step 2 with the second private key from a listening secure device 10 that has been retrieved by the initiating secure device 10 at step 16. Similarly, the listening secure device 10' generates an identical, unique KEK by exclusively or-ing (EXOR) the second private key generated by the listening secure device 10' at step 10 with the first private key generated by the initiating secure device 10 is retrieved by the listening secure device 10' at step 8.

In one embodiment, call set up encryption (CSE) can be used between the group initiator and secure group members to allow for authenticated KEK establishment. CSE may be applied during the AKE used to establish the KEK to provide for user authentication between the initiating secure device 10 and the listening secure device 10'. A shared secret (such as an ID hardcoded into the phone) known between the initiating secure device 10 and the listening secure device 10' can be used to encrypt the asymmetric message set that is used to establish the KEK. This can allow a user to know which other wireless secure devices can be trusted so long as they have the shared secret stored in their wireless secure device.

Figure 9:
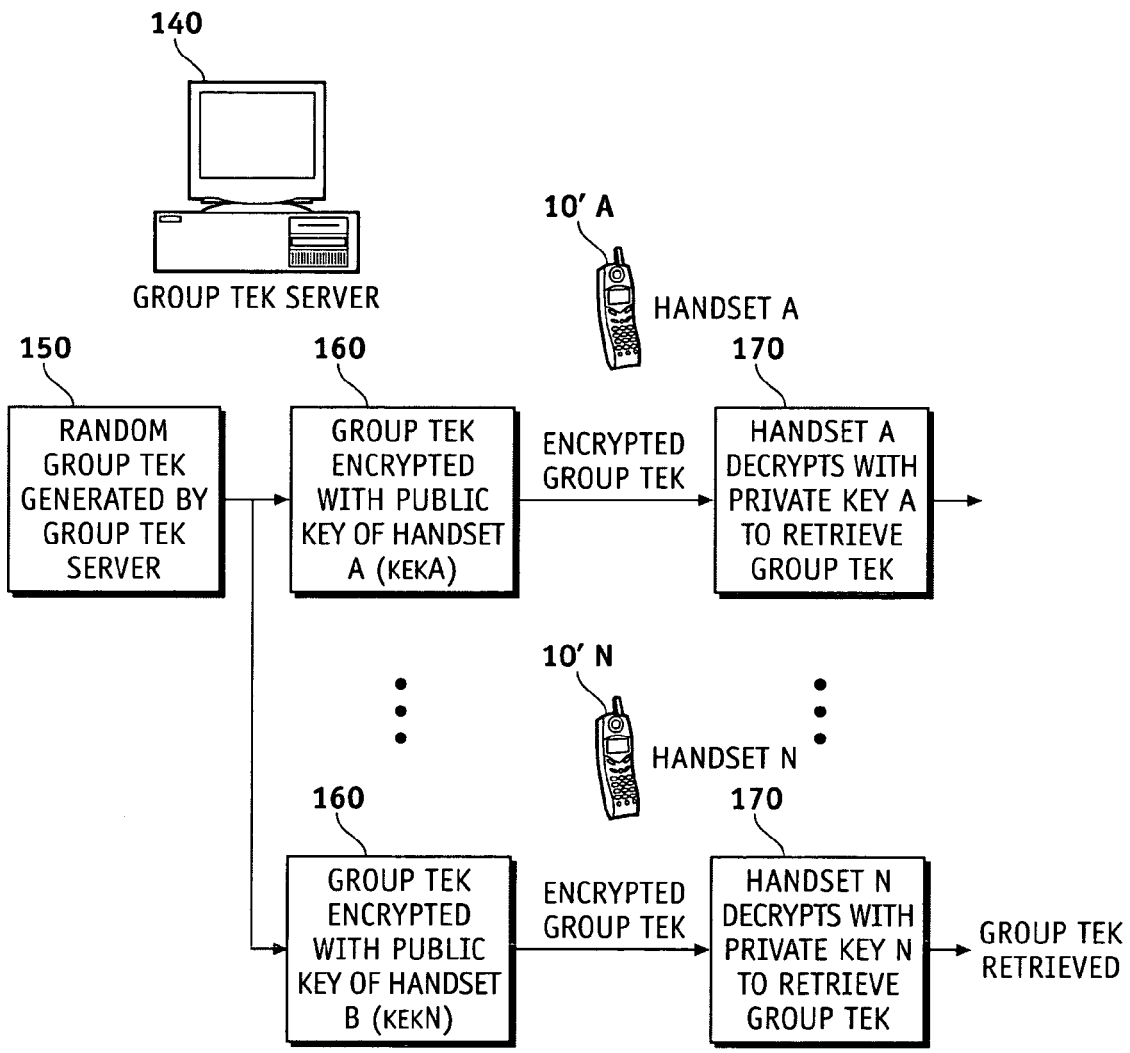
FIG. 9 is a call flow diagram which illustrates an exemplary process for distributing a group TEK (TEK)

FIG. 9 is a call flow diagram which illustrates an exemplary process for distributing a group TEK to each group member.

At step 150, a group TEK server 140 generates a random group TEK, and sends the group TEK to an initiating secure device 10. This can happen in the background when the initiating device 10 is in an idle mode. The TEK can be obtained immediately when the group is defined or obtained over time as users are added to or deleted from an existing group. The group TEK server 140 can be a network server or can be implemented within the initiating secure device 10.

At step 160, the initiating secure device 10 encrypts the group TEK with a unique KEK (public key) that corresponds to a first listening secure device $10_A'$ to generate an encrypted group TEK. The initiating secure device 10 can then send the encrypted group TEK to the first listening secure device $10_A'$.

At step 170, the first listening secure device $10_A'$ uses its private key, which corresponds to the unique KEK (public key) for that listening secure device $10_A'$, to decrypt the encrypted group TEK and thereby generate or retrieve the group TEK.

Steps 150-170 are then repeated for each listening secure device through $10_N'$ until all listening secure devices have retrieved the group TEK. For example, the initiating secure device 10 encrypts the group TEK with a unique KEK (public key) that corresponds to the Nth listening secure device $10_N'$ to generate an encrypted group TEK. The initiating secure device 10 can then send the encrypted group TEK to the Nth listening secure device $10_N'$. The Nth listening secure device $10_N'$ uses its private key, which corresponds to the unique KEK (public key) for the Nth listening secure device $10_N'$, to decrypt the encrypted group TEK and thereby generate or retrieve the group TEK.

In one embodiment, an initiating secure device 10 can create a GML for a secure PTT group call and then distribute the group TEK without the aid of infrastructure. A group member list (GML) may be defined by an initiating device 10 which specifies the listening devices 10' in the group. If the group is pre-defined such that all listening devices 10' in the group are specified, then the TEK can be generated and distributed by the initiator of the call. The initiator's initiating device 10 can distribute the TEK based on the pre-defined GML.

In another embodiment, the initiating secure device 10 can create a GML for a secure PTT group call and then designate a trusted proxy to distribute the group TEK without the aid of infrastructure. An ad-hoc initiating secure device 10 can designate a trusted proxy to distribute the group TEK to all or a portion of the GML. The initiating secure device 10 sends the GML to the proxy with a group security association request. The proxy then distributes the group TEK to each group member. The proxy can be a member of the secure group, or a network server. In some situations, an outsider may seek to join an existing group. In one implementation, the GML can be managed by the network. The network identifies a particular handset as a TEK server, and the handset maintains a list of TEKs for each of the group members. When the outsider seeks to join an existing group (e.g., a new addition to an existing group), then the outsider retrieves an existing TEK from the TEK server which can be implemented remotely in a PTT server or in locally the initiator's handset. The outsider might try to participate in an ongoing secure group voice call, but the voice signal will be unintelligible to the outsider until the outsider obtains the TEK for that group voice call. Once the outsider obtains the group TEK from the TEK server, the outsider can use their public key to decrypt the TEK, and can then hear the group voice call.

Figure 10:
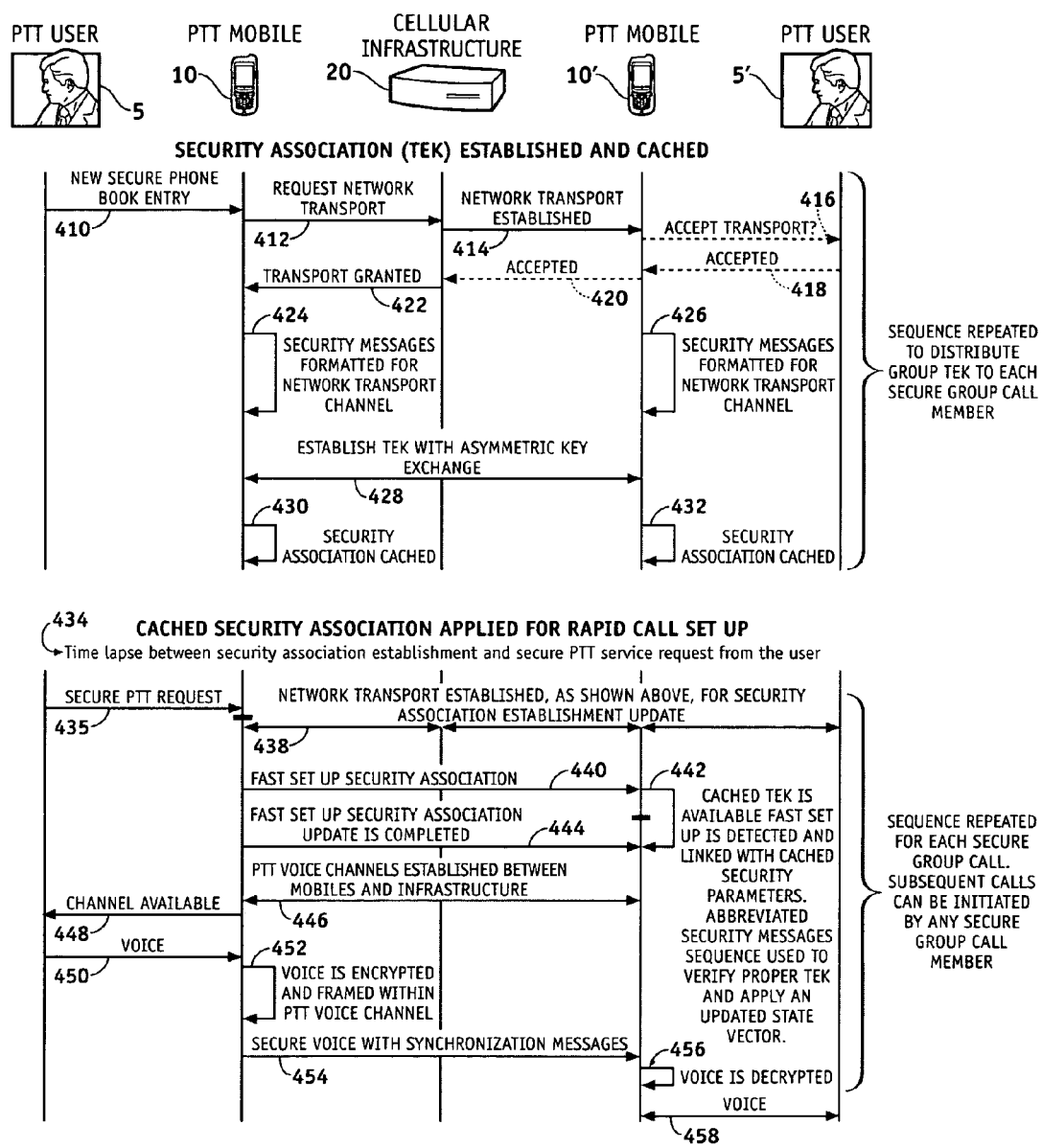
FIG. 10 is a call flow diagram which illustrates an exemplary process for establishing and caching a security association at an initiating device and at a group of listening devices, and using the cached security associations to provide a secure call with a rapid, secure call set-up sequence.

FIG. 10 is a call flow diagram which illustrates an exemplary process for establishing and caching a security association at an initiating device and at a group of listening devices, and using the cached security associations to provide a secure call with a rapid, secure call set-up sequence.

When talking to a new person, a full AKE process can be initiated to generate a new KEK in response to a rapid secure call set up received with an unknown KEK. In other words, if the KEK is sent and the listening secure device 10' does not have the specified KEK, then the initiating secure device 10 initiates a full AKE sequence.

In one embodiment, a secure group TEK distribution request or a new phonebook entry in the GML by the initiating secure device 10 triggers the sequence to distribute the group TEK to each group PTT call member. In another embodiment, described above, the sequence to distribute the group TEK to each group PTT call member may be initiated in advance of a PTT call when the user enters a secure group PTT recipient client number/identifier in a secure group PTT call phone book directory. At step 410, a group call initiator 5 enters a new secure phone book entry into the initiating secure device 10 or enters a group TEK request into the initiating secure device 10. At step 412, the initiating secure device 10 send a request to cellular infrastructure 20 for a network transport service. At step 414, the cellular infrastructure 20 establishes network transport with the listening secure device 10'. At step 416, the listening secure device 10' may optionally ask a listener 5' if they accept the network transport. At step 418, the listener 5' may optionally indicate that he accepts the network transport, and at step 420, the listening secure device 10' communicates this acceptance to the cellular infrastructure 20. Steps 416-420 are optional since some PTT systems, such as the iDEN PTT system, have a "barge" feature for group calls in which listening secure devices automatically accept the network transport and no user confirmation is necessary, similar to private dispatch PTT.

At step 422, the cellular infrastructure 20 grants transport to the initiating secure device 10. At steps 424 and 426, the initiating secure device 10 and the listening secure device 10' format security messages for the network transport channel. From here, this process can then be organized into three sub-processes.

The first sub-process includes techniques of using AKE messages to allow the initiating secure device 10 to establish unique KEKs for each of the listening secure devices 10'. At step 428, the listening secure device 10' and the initiating secure device 10 establish a KEK via an AKE. The AKE used to establish the KEK can be accomplished using any of the techniques described above to carry the security association establishment messages.

As discussed above with respect to FIGS. 6 and 9, once the unique KEKs are established, the group TEK can then be encrypted using the unique KEK of each of the listening secure devices 10' and separately distributed to each listening secure devices 10' by the initiating secure device 10. The sequence of steps 410-428 are repeated to distribute the group TEK to each of the listening secure devices 10' on the GML. For sake of simplicity, the group TEK distribution process will not be described again. Once the group TEK has been distributed, a channel for the secure group PTT call is established and can be used to transmit secure voice to each of the listening secure devices 10'.

TEK is Cached for Future Secure Group PTT Calls

In the second sub-process, shown at steps 430 and 432, the security associations including the group TEK and unique state vectors are cached for future secure group PTT calls by the initiating secure device 10 and the listening secure devices 10'. The cached security associations can help provide a fast secure call set up sequence in a subsequent secure group PTT call by allowing for shortened and fast secure message set up sequences. A subsequent secure call can then start with the cached group TEK and the unique, updated state vectors for cryptographic synchronization. This requires less secure set up data transfer and results in a faster secure group PTT call set up time. Caching TEKs for future secure group PTT calls with the same secure group call member list can result in rapid secure group PTT call set up times, since only sync acquisition needs to occur.

Cached Group TEK is Applied to Voice Packets in a Secure Group PTT Call.

After a time lapse, between establishing the security association during the first session, the third sub-process begins which uses the cached security association to encrypt/decrypt voice packets and format them within half-duplex PTT channel structures.

At step 435, the initiator 5 enters a secure group PTT call request and confirms that the cached security association is available for the requested group. Steps 410-422 described above are then repeated. For sake of simplicity, these steps will not be described here again.

At step 446, a secure group PTT voice channel is established between the initiating secure device 10 and the listening secure devices 10' by the cellular infrastructure 20. In addition, in some PTT systems, the listening secure devices 10' may optionally ask the group PTT call members 5' whether they accept the group call, and the group PTT call members 5' can respond. Alternatively, in other PTT systems, the user confirmation can take place automatically. At step 448, the initiating secure device 10 lets the group call initiator 5 know that the secure group PTT voice channel has been established and is available. At step 450, the group call initiator 5 speaks into the initiating secure device 10.

At step 452, the initiating secure device 10 encrypts and frames the voice frames of the talker 5 to fit within the PTT voice channel. A start up cryptographic synchronization message is also generated which helps initialize cryptographic synchronization at the start of the secure voice. The cryptographic synchronization messages are applied to the half-duplex PTT channel structures to maintain secure call synchronization. The encrypted voice and periodic cryptographic synchronization messages are formatted to fit within the PTT cellular network traffic channel. During secure voice, periodic cryptographic sync messages are adapted to maintain cryptographic synchronization throughout the remainder of the secure group PTT call. This completes the secure group PTT traffic channel.

At step 454, the initiating secure device 10 sends the secure voice with the synchronization messages to the listening secure device 10'. At step 456, the listening secure device 10' decrypts the secure voice using the security association as discussed above. At step 458, the listening secure device 10' sends the unencrypted voice to the listener's 5' speaker.

The sequence of steps 435-458 are repeated for each secure group call. Subsequent calls can be initiated by any secure group call member.

Figure 11:
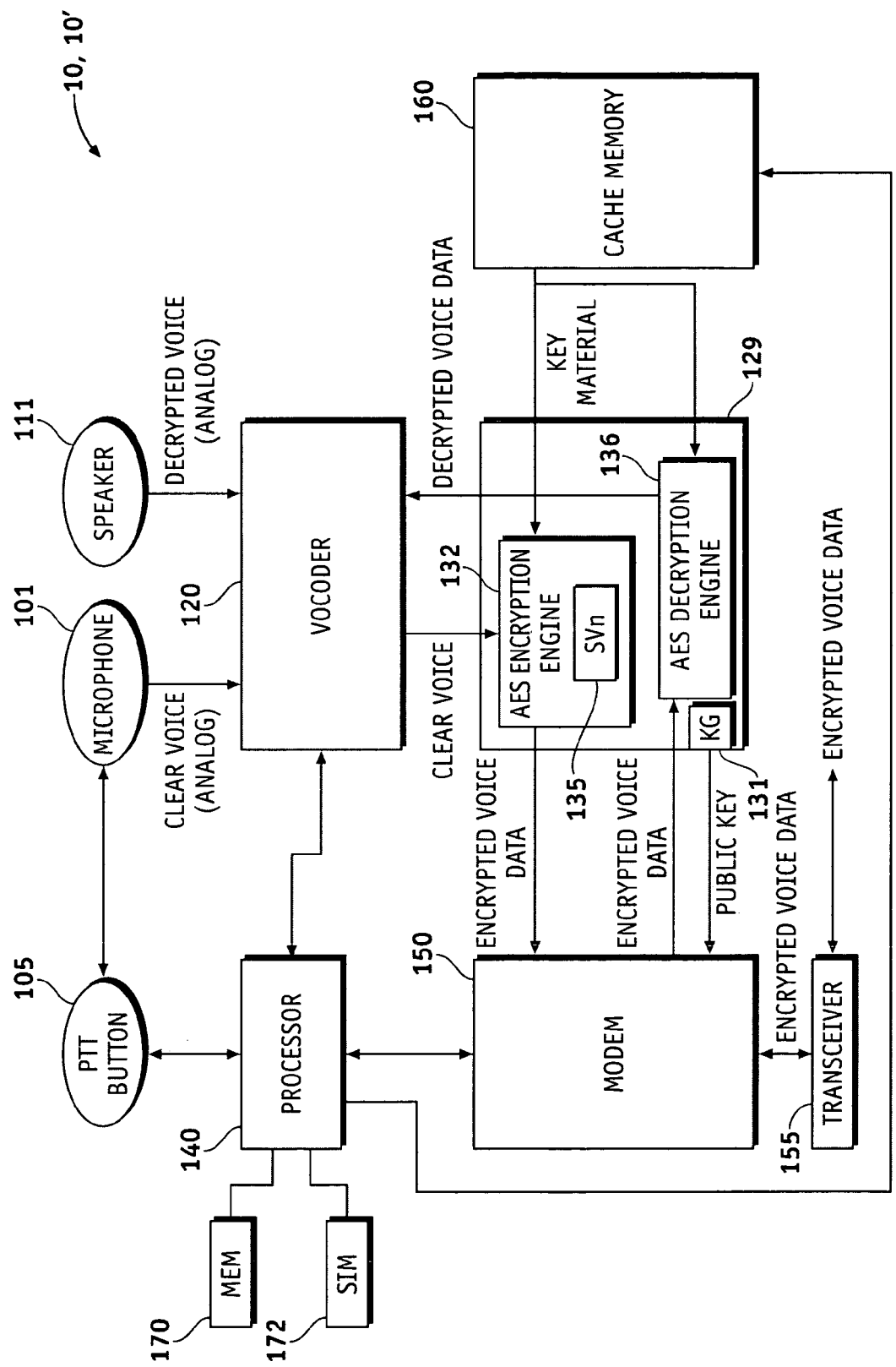
FIG. 11 is a block diagram of an exemplary wireless device that can be used in the communication systems of FIGS. 1-5.

FIG. 11 is a block diagram of a wireless device that can be used in the communication systems of FIGS. 1-5. In FIGS. 1-5, the initiating secure device is denoted with the reference numeral 10, whereas the listening secure devices in the group are denoted with the reference numerals 10', 10" and 10'". For sake of simplicity secure group PTT communications between a single listening device 10' of the group and a single initiating device 10 will be described although a group typically comprises a plurality of listening devices 10'.

The wireless device 10, 10' shown in FIG. 11 can be an initiator or listener in a secure wireless Push-to-Talk (PTT) dispatch system. To illustrate how the wireless device would work in the context of a secure group PTT dispatch system, in the description that follows, these different initiating and listening functionalities of the wireless device will be described with respect to an initiating secure device 10 and a listening secure device 10'. It should be appreciated, however, that the wireless device 10 of FIG. 11 includes all of the functionality of both the initiating secure device 10 and the listening secure device 10'. It should also be appreciated that the initiating secure device 10 and the listening secure device 10' comprise the same elements, but that only the elements in the initiating secure device 10 and the listening secure device 10' which interact on each side of a secure group PTT communication will be described.

The initiating secure device 10 includes, for example, a microphone 101, a PTT button 105, a speaker 111, a vocoder 120, a security subsystem 129, a processor 140, a modem 150, a first transceiver 155, a first cache memory 160, a memory 170 and a Subscriber Identity Module (SIM) 172. The security subsystem 129 comprises a key generator 131, an encryption engine 132 which includes a state vector generation unit with a synchronization message generator (not shown), and a decryption engine 136. The listening secure device 10' comprises the same elements as the initiating secure device 10. In the description that follows, to distinguish the initiating secure device 10 from the listening secure device 10', the decryption engine of the listening secure device 10' will be described as a second decryption engine 136', the transceiver of the listening secure device 10' will be described as a second transceiver 155', and the cache memory will be described as a second cache memory 160' although these components are actually implemented in the decryption engine 136, the first transceiver 155 and the first cache memory 160. The first and second transceivers 155, 155' each comprise a transmitter subsystem and a receiver subsystem (not shown).

The microphone 101 is coupled to the PTT button 105 and the vocoder 120. The PTT button 105 is also coupled to the processor 140. The speaker 111 is coupled to the vocoder 120. The vocoder 120 is coupled to the processor 140, and the encryption engine 132 and the decryption engine 136 of the security subsystem 120. The security subsystem 129 is coupled to the modem 150 and the cache memory 160. The processor 140 is coupled to the vocoder 120, the modem 150 and the cache memory 160. The cache memory 160, 160' is coupled to the encryption engine 132 and the decryption engine 136 of the security subsystem 120. The memory 170 and the Subscriber. Identity Module (SIM) 172 are coupled to the processor 140. The modem 150 is coupled to the transceiver 155, 155'.

To begin a secure group PTT call, the user of the initiating device 10 pushes the PTT button 105 to request permission to speak. When the user pushes the PTT button 105, the processor 140 generates a secure group PTT service request message that is sent to the network via the transmitter subsystem in the first transceiver 155. If the network decides to grant the user's service request, the network sends a grant message that is received by a receiver in the transceiver 155. The processor 140 processes the grant message and can send an audible tone to the speaker 111 which lets the user know that the floor has been granted.

The user speaks into the microphone 101. The microphone 101 converts the user's voice into an analog signal representing the user's voice, and sends this analog signal to the vocoder 120. The vocoder 120 receives an analog voice signal from the user of the initiating device, via the microphone 101, and generates clear voice packets from the voice signal. These voice packets are sent to the encryption engine 132.

How the call set up proceeds from this point depends on whether the initiating device 10 has previously established a security association (including the GML, group TEK and unique state vectors) with each of the listening devices 10'. The processor 140 determines if the initiating device 10 has previously established a security association with each of the listening devices 10' by checking the cache memory 160 to determine if a security association is available. If a security association for the listening device 10' has already been negotiated and stored, then the initiating device 10 uses the stored security association to begin a secure session. This process will be described in detail below. By contrast, if a security association is not available, then the secure group PTT service request also triggers an asymmetric key exchange to establish a unique KEK for each of the listening devices 10' which can be used to distribute a security association to each of the listening devices 10', as will now be described in detail.

A unique KEK for a first secure group PTT session between the initiating secure device 10 and each of the listening secure devices 10' can be generated by exchanging asymmetric key exchange (AKE) messages.

In one embodiment, the unique KEKs for the first session can be established via an AKEs over, for example, a reliable network transport service. Examples of the reliable network transport service can include, for example, a reliable signaling plane network services, such as GSM Unrestricted Supplementary Service Data (USSD), Packet cellular IP service, a reliable security application over UDP/IP or TCP/IP, a reliable security application over short message service and enhanced short message service, a reliable security application over multi-media message or instant messaging services, a mobile to mobile full duplex circuit data calls, or voice payloads which carry a reliable transport.

In another embodiment, instead of using the reliable network transport service discussed above, the unique KEKs for the first session can be established via an AKEs over, for example, a half-duplex PTT voice channel by packing the data exchanged during the AKE into voice frames. The data exchanged during the AKE can be formatted differently to get highly protected data through instead of putting it into voice frames. The data exchanged can be packaged into the structure used for the voice frames so that it fits within the PTT voice frame structures on any one of the PTT voice channels illustrated in FIGS. 2-5. The voice frames can be replaced with highly protected data frames, but to the network these specially formatted data frames are treated as regular voice frames. These data frames can be transmitted over the same half-duplex PTT voice channel. This type of AKE helps ensure reliability via error correction and retransmission used on the half-duplex PTT voice channel.

As will now be described, regardless of the method by which the AKE takes place, the AKE process is basically the same.

Figure 12:
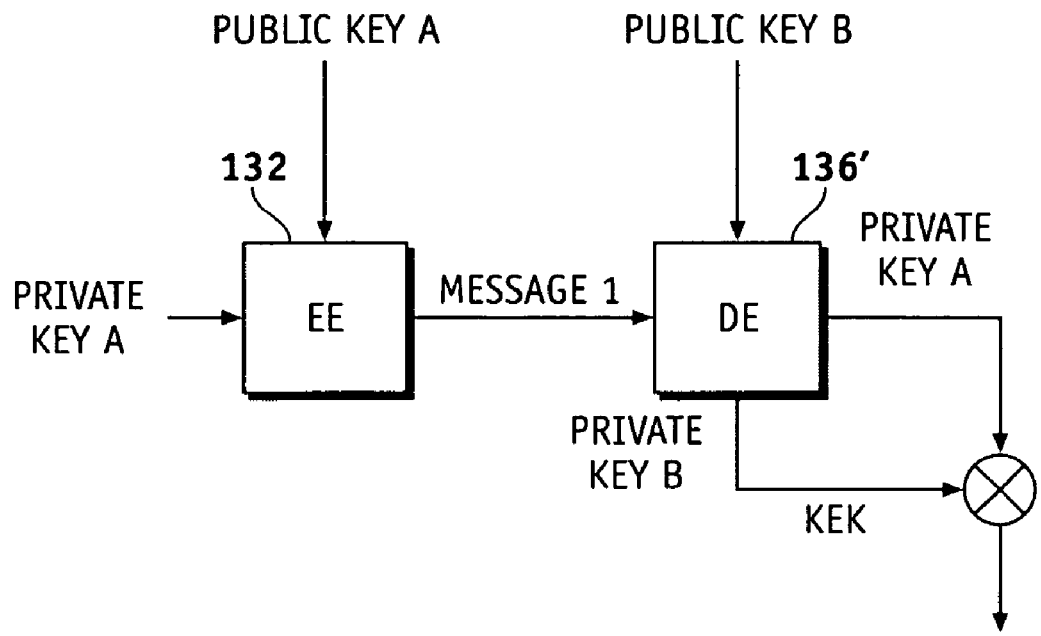
FIG. 12 is a block diagram of an exemplary embodiment of an encryption engine and a decryption engine of the security subsystem of FIG. 11 showing a process of generating a KEK between the encryption engine of an initiating device and a decryption engine of a listening device.

FIG. 12 is a block diagram of an exemplary embodiment of an encryption engine and a decryption engine of the security subsystem of FIG. 11 showing a process of generating a KEK between the encryption engine of an initiating device and a decryption engine of a listening device. The encryption engine and the decryption engine of FIG. 12 implement the process of generating a KEK shown in the call flow diagram of FIG. 8. FIG. 12 describes how a unique Key Encryption Key (KEK) used for secure communications between an initiating secure device 10 and one of the listening secure devices 10' on the group member list can be generated. It should be appreciated, however, that this process is performed for each listening secure device 10' in the group member list until every listening secure device 10' has its own unique KEK.

The encryption engines 132, 132' in each of the devices 10, 10' randomly generate a public key and a private key. The private key is typically generated by a random number generator in the encryption engine 132, 132'. For example, the encryption engine 132 can generate a first public/private key pair in, and the encryption engine 132' can generate a second public/private key pair. Both devices 10, 10' allow everyone access to their public key.

The encryption engine 132 generates a first private key to send to decryption engine 136'. The encryption engine 132 encrypts the first private key using an appropriate asymmetric algorithm and the second public key generated by decryption engine 136'. The encryption engine 132 then sends a resulting message to decryption engine 136'.

Using its own second public key, the decryption engine 136' decrypts message 1 received from encryption engine 132. The first private key from encryption engine 132 can then be retrieved by the decryption engine 136'. The decryption engine 136' generates a second private key to send to the encryption engine 132, and the encryption engine 132' encrypts the second private key using an appropriate asymmetric algorithm and the first public key generated by encryption engine 132. The encryption engine 132' then sends message 2 to the decryption engine 136. The decryption engine 136 uses its own first public key to decrypt the message received from the encryption engine 132' so that the second private key from encryption engine 132' can be retrieved.

The decryption engines 136, 136' both use the first public key and the second public key to generate the unique KEK for the first session. For example, the decryption engine 136 can generate the unique KEK by exclusively or-ing (EXOR) the first private key generated by the encryption engine 132 with the second private key that has been retrieved by the encryption engine 132. Similarly, the decryption engine 136' generates an identical, unique KEK by exclusively or-ing (EXOR) the second private key generated by the decryption engine with the first private key retrieved by the decryption engine 136' at step 8.

In one embodiment, once a KEK has been established between these two secure group PTT members it can be cached by at initiating secure device 10 and the listening secure device 10' and updated for use in another group TEK distribution, yielding rapid secure group TEK distribution. The initiating secure device 10 and the listening secure device 10' can then use the KEK for future ad-hoc or static group call TEK distributions on any group call where both are members. This provides the means for a single KEK to be used to support multiple group calls with separate group member lists. A recipient listening secure device 10' can respond back to the initiating secure device 10 with a full asymmetric key exchange if it receives a group TEK distribution attempt with an unknown KEK.

Figure 13:
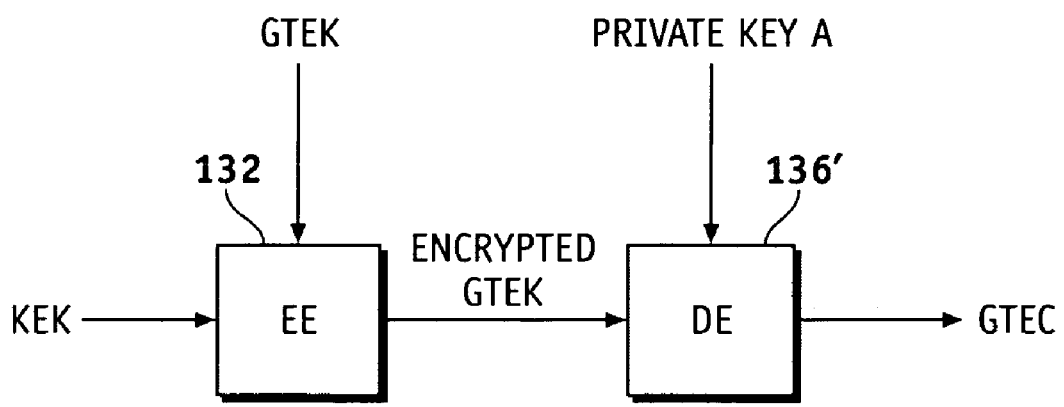
FIG. 13 is a block diagram of an exemplary embodiment of an encryption engine and a decryption engine of the security subsystem of FIG. 11 showing a process of retrieving a group TEK sent from the encryption engine of an initiating device to the decryption engine of a listening device.

FIG. 13 is a block diagram of an exemplary embodiment of an encryption engine and a decryption engine of the security subsystem of FIG. 11 showing a process of distributing a group TEK sent from the encryption engine of an initiating device to the decryption engine of a listening device. The encryption engine and the decryption engine of FIG. 13 implement the process distributing a group TEK to each group member shown in the call flow diagram of FIG. 9.

A group TEK server 140 generates a random group TEK, and sends the group TEK to initiating secure device 10 for distribution to the listening secure devices 10' included in a GML for the secure PTT group call. The group TEK server 140 can be a network server or can be implemented within the initiating secure device 10.

The encryption engine 132 encrypts the group TEK with a unique KEK (public key) that corresponds to a listening secure device 10' to generate an encrypted group TEK. The encryption engine 132 sends the encrypted group TEK to the listening secure device 10'.

The decryption engine 136' of the listening secure device 10' uses its private key A, which corresponds to the unique KEK (public key) for that listening secure device 10', to decrypt the encrypted group TEK and thereby generate or retrieve the group TEK.

The encryption engine 132 can repeat this process for each listening secure device until all listening secure devices have retrieved the group TEK. The initiating device 10 and each listening device 10' stores the security association, which comprises the GML, the group traffic encryption key (TEK) and a unique state vector for each of the listening devices 10', in the cache memory for future use.

Referring again to FIG. 11, the first cache memory 160 of the initiating secure device 10 is configured to store the TEK. The initiating secure device 10 associates the shared symmetric key or TEK and the unique state vector for each of the listening secure devices 10' with that particular listening secure device 10'. The second cache memory 160' of the listening secure device 10' also stores the TEK and the unique state vector for that particular listening secure device 10'. The listening secure device 10' can associate this shared symmetric key or group TEK and the unique state vector for that particular listening secure device 10' with the initiating secure device 10. The shared symmetric key or group TEK and the unique state vector for that particular listening secure device 10' can then be used during a subsequent secure session between the initiating secure device 10 and the listening secure device 10' to encrypt and decrypt voice packets.

In an alternative embodiment, a Subscriber Identity Module (SIM) module can be used to store the security associations. By storing the security association parameters on the SIM, a security association can be linked to a mobile network subscription rather than the wireless secure device. As such, the user can transfer the SIM and stored security associations between different devices the user uses. The user can continually upgrade/replace their phone and not disrupt or change the security associations as long as the same SIM is used in each secure device. The security parameters are transparent to the mobile network subscription and infrastructure, but the user can reference or apply the security association to mobile subscription characteristics, for example, MS ISDNs. This can improve security association portability.

Figure 14:
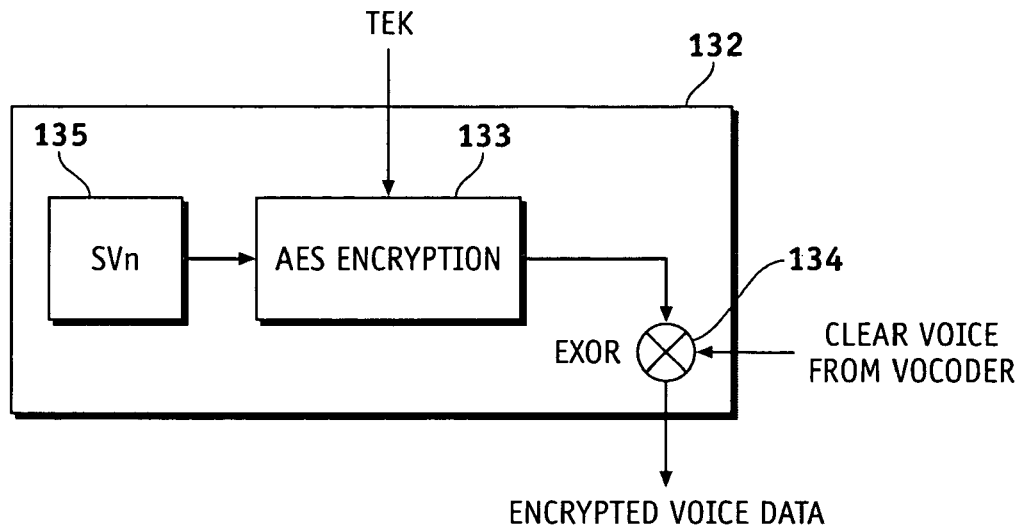
FIG. 14 is a block diagram of an exemplary embodiment of the encryption engine of the security subsystem of FIG. 11.

FIG. 14 is a block diagram of one embodiment of the encryption engine 132 of the security subsystem of FIG. 11. The encryption engine 132 is configured to use the cached security association stored in the cache memory 160 and an updated state vector to encrypt the voice packets.

The encryption engine 132 comprises a state vector generator 135, an encryption unit 133 and an exclusive OR function (EXOR) 134.

When the initiating device 10 wants to speak, the initiating device 10 continually lets the listening device a 10' know where to begin decrypting their voice signal. To do so, the state vector generator 135 of the initiating device 10 generates an updated state vector. The state vector generator 135 allows initiating device 10 to encrypt their voice uniquely using their own unique state vector which is distributed at the beginning of and during transmission of voice traffic. The state vector generator 135 generates the state vector based on something unique to the initiating device 10 (e.g., a SIM card ID, a serial number ID, or other ID). In one implementation, the lower bits of the state vector can be set to zero and the upper bits set to the initiating device's 10 serial number. Thus, when initiating device 10 depresses his PTT button to being talking, initiating device 10 communicates his current state vector to each of the listening devices 10'. The state vector is continuously updated each time the initiating device 10 depresses their PTT button to speak.

In one embodiment, the state vector generator 135 comprises a synchronization message generator which can be configured to generate the synchronization message. Each user encrypts their voice uniquely using their own unique state vector. The initiating device 10 broadcasts a state vector associated with a particular GML at the outset of a dispatch to that particular group so that the listening devices 10' of the other group members can decrypt the encrypted voice signal. Each of the group members knows the group TEK associated with that particular group. Because the state vector is unique, for a group call, the initiating device 10 sends the synchronization message to the listening devices 10' to let the listening devices 10' know what the start value of the state vector is so that the listening devices 10' know when to begin decrypting the encrypted voice signal by using the group TEK. At least one of the encrypted voice packets of an encrypted voice frame being sent from the initiating secure device 10 to the listening secure device 10' can be replaced with the synchronization message. The encrypted voice packets being replaced may comprise encrypted voice packets that include the least significant bits of the encrypted voice frame, and the encrypted voice packets and synchronization messages are formatted to fit within the half-duplex PTT voice channel.

To accomplish this, the encryption unit 133 receives the group TEK from the cache memory 160 and the updated state vector generated by the state vector generator 135. Both initiating device 10 and listening device 10' have the same group TEK. Each unique state vector generated has a unique forward counting "crypto-sync counter." Each transmit crypto-sync counter is unique because it is based in part on a unique ID associated with each device. When the unique state vector is loaded into an encryption unit 133, the counter in the state vector is incremented by one to get each new voice frame. The encryption unit 133 encrypts the GTEK and state vector to generate an encrypted state vector comprising the group TEK and the updated state vector.

The exclusive OR function (EXOR) 134 receives the encrypted state vector from the encryption unit 133 and combines the encrypted state vector with clear voice packets received from the vocoder 120 to generate an encrypted voice stream comprising encrypted voice frames. Each of the encrypted voice frame comprises encrypted voice packet(s).

The encryption engine 137 can also include a synchronization message insertion unit (not shown) which can be configured to periodically or randomly replace partially or completed at least one of the encrypted voice packets of an encrypted voice frame with the synchronization message. In one embodiment, the encrypted voice packets which are replaced by the synchronization message comprise encrypted voice packets that have the least significant bits of the encrypted voice replaced with the synchronization message. In another embodiment, the encrypted voice packets and synchronization messages can be formatted to fit within the half-duplex PTT voice channel.

The modem 150 is configured to format the encrypted voice packets to fit within half-duplex PTT voice channel. The transmitter in transceiver 155 is configured to transmit the encrypted/formatted voice packets and the synchronization message(s) to the transceiver 155' over the half-duplex PTT voice channel. In one embodiment, the voice frames can be protected by a Forward Error Correction code.

The transceiver 155' of the listening secure device 10' receives the encrypted/formatted voice packets with the synchronization message(s) from the transceiver 155 over the half-duplex PTT voice channel. The transceiver 155' sends the encrypted/formatted voice packets with the synchronization message(s) to the modem 150 where they are unformatted and sent to the decryption engine 136' as encrypted voice.

Figure 15:
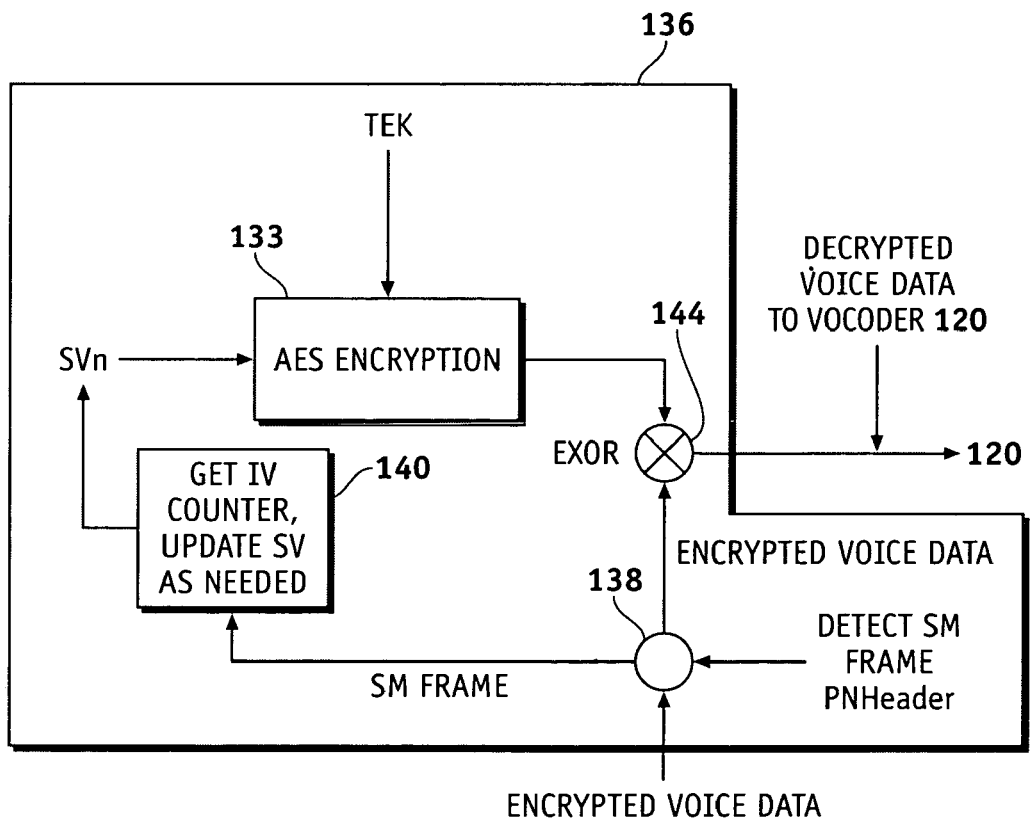
FIG. 15 is a block diagram of an exemplary embodiment of a decryption engine of the security subsystem of FIG. 11.

FIG. 15 is a block diagram of one embodiment of a decryption engine 136 of the security subsystem of FIG. 11. The decryption engine 136 comprises an encryption unit 133, a synchronization message detector 138, a counter 140, and an exclusive OR function (EXOR) 144.

The synchronization message detector 138 is coupled to the counter 140 and the exclusive OR function (EXOR) 144. The counter 140 is coupled to the encryption unit 133. The encryption unit 133 is coupled to the exclusive OR function (EXOR) 144. The exclusive OR function (EXOR) 144 is coupled to the vocoder 120.

The decryption engine 136' of the listening device 10' can use the cached group TEK and the updated state vector to decrypt the encrypted voice packets received from the initiating device 10. Once the listening device 10' receives the encrypted voice packets and the synchronization message from the initiating secure device 10, the decryption engine 136' uses the synchronization message to initialize cryptographic synchronization at the start of a secure voice frame to thereby compensate for any voice packets lost or gained during transmission.

In one embodiment, the synchronization message detector 138 receives encrypted voice packets and an input which detects a synchronization message frame pseudorandom number (PN) header. The input which detects a synchronization message frame PN header, when combined with the encrypted voice packets, generates a synchronization message frame number which can then be passed on to the counter 140. The synchronization message detector 138 passes the encrypted voice packets to the exclusive OR function (EXOR) 144 without modification.

The counter 140 counts the synchronization message frame number and generates the updated state vector which it passes to the encryption unit 133. The counter 140 of the state vector ensures that the counter begins at a different value in each session so that the key stream generated in each session is different and does not repeat.

The inputs to the decryption engine 133 are the unique state vector and the group TEK. The encryption unit 133 obtains the previously established group TEK from the cache memory 160' of the listening secure device 10'. The encryption unit 133 uses the updated state vector and the group TEK to generate a key stream that allows the encrypted voice packets to be decrypted. The key stream is identical to the encrypted state vector generated by the initiating device 10. The state vector ensures that the counter begins at a new value during each session to help ensure that the key stream does not repeat. Since the counter begins at a different value in each session, the key stream generated is different in each session.

The exclusive OR function (EXOR) 144 combines the encrypted state vector and the encrypted voice packets by performing an exclusive or operation on these inputs to generate decrypted or unencrypted voice packets which can then be sent to the vocoder 120.

The vocoder 120 replaces the start-up synchronization messages in the decrypted voice packets with silence. The vocoder 120 uses the decrypted voice packets to generate an analog voice signal which it sends to the speaker 111 where it can be heard by the user of the listening secure device 10'.

Although not shown, the memory 170 can store information that can be used to provide a number of features such as a secure group PTT call phone book directory and an address book. These features can be used in conjunction with embodiments of the invention to provide a number of enhanced functions. For instance, in some embodiments, symmetric keys can be negotiated in advance instead of on-demand to separate call-set up state from the traffic state.

In one embodiment, the memory 170 of the initiating secure device 10 can also include an address book. An AKE can be initiated in advance of a subsequent secure group PTT call when the initiating secure device 10 selects the listening secure device 10' listed in the address book and designates the listening secure device 10' as being authorized to receive secure messages or secure group PTT calls from the initiating secure device 10. In this case, the initiating secure device 10 can call the listening secure device 10' while the initiating secure device 10 is idle to establish the security association via the AKE before initiating the subsequent secure group PTT call. In other words, the user's wireless secure device performs an AKE in the background while the device is idle so that the symmetric key is already in place when the user goes to make a call to the other party.

The initiating secure device 10 can also include a secure group PTT call phone book directory maintained in memory 170. The AKE can initiate in advance of a subsequent secure group PTT call, for example, when a client number/identifier of the listening secure device 10' is entered in the secure group PTT call phone book directory. The listening secure device 10' can also include a secure group PTT call phone book directory.

In other embodiments, alternate network services can be used to update security associations when the wireless secure device is in an idle state in advance of a subsequent secure group PTT call. For instance, non-voice network services, such as network signaling or IP network transport, can be used to establish a security association for subsequent secure voice channels when the initiating secure device 10 is in an idle state. This produces an improvement in secure call set up time.

According to another alternative embodiment, to extend time between updating group TEKs, the cached group TEKs can be deterministically updated prior to use in a future call. In this alternate embodiment, the cached group TEKs can be deterministically updated by simultaneously running an algorithm in both the initiating secure device 10 and the listening secure device 10' to update the cached group TEK and compute a new group TEK. The updates can be event-based or timer-based. For example, the event-based update might use a shared event between the initiating secure device 10 and the listening secure device 10' could be utilized such that the cached group TEK is updated when the initiating secure device 10 and the listening secure device 10' speak with each other. Alternatively, the timer-based update could be timer based using a trusted clock or counter that is synchronized between the initiating secure device 10 and the listening secure device 10'. The new group TEK, derived from cached group TEKs, may be calculated and applied to PTT upon every new PTT call, or whenever the exiting cached group TEK has reached a maximum use threshold set by security policy. By calculating a new group TEK, secure group PTT call set up times can be further improved.

In another embodiment, to extend time between updating group KEKs, cached KEKs can also be deterministically updated. Because KEKs are cached in a group call situation, before a KEK is used a new KEK can be generated which is different than the KEK which was previously used. In this alternate embodiment, the cached KEKs can be deterministically updated by simultaneously running an identical, predefined in both the initiating secure device 10 and the listening secure device 10' to deterministically update the cached KEK in order to compute a new KEK for use in a future call. This new KEK, derived from cached KEKs, may be calculated and applied to PTT upon every new PTT call, or whenever the exiting cached KEK has reached a maximum use threshold set by security policy. The updates can be event-based or timer-based. For example, the event-based update might use a shared event between the initiating secure device 10 and the listening secure device 10' could be utilized such that the cached KEK is updated when the initiating secure device 10 and the listening secure device 10' speak with each other. Alternatively, the timer-based update could be timer based using a trusted clock or counter that is synchronized between the initiating secure device 10 and the listening secure device 10'. By calculating a new KEK, secure group PTT call set up times can be further improved.

Thus, numerous embodiments have been disclosed above which can provide techniques to quickly establish secure statically defined group calls and ad-hoc defined group calls in cellular based PTT systems. These embodiments can allow for the formatting/combination of secured voice packets into group half duplex cellular circuit network channels produced an end-to-end security improvement. In some of these embodiments KEKs can be cached to provide fast group TEK distribution. These cached KEKs can be deterministically updated to calculate a new PTT KEK to thereby improve group TEK distribution. A full asymmetric key exchange can be initiated to calculate a new KEK in response to a fast secure group TEK distribution received with an unknown KEK. This also supports fast group TEK distributions. A group TEK can be established between the secure devices prior to the secure PTT call by a number of alternate embodiments as explained above. Other embodiments can allow for caching of group TEK parameters to produce improvements in the initial secure group call set up times, since only sync acquisition is all that needs to occur. The end-to-end group security association parameters/data/keys can be stored on a cellular subscription device, such as the SIM, to link a security association to a mobile network subscription rather than a mobile device. This improves security association portability. The use of non-voice network services, such as network signaling or IP network transport, to establish a security association for subsequent secure voice channels produces an improvement in secure group call set up times. Cached TEKs can be deterministically updated to calculate a new PTT TEK. This improves secure group PTT call set up times. In other embodiments, a user has the ability to create a secure group on the mobile station and then distribute the secure group member list, group member state vector, and group TEK without the need for infrastructure. This improves on-demand, flexible group PTT security methods. In other embodiments, the user can create a secure group on the mobile station and then designate a proxy to distribute the secure group member list, the group TEK, and member state vector. This improves on-demand, flexible group PTT security methods. In other embodiments, the user can designate which portion of the group TEK stream will be used by each secure group member. This helps to ensure that no two members use the same key stream sequence, which would compromise the confidentiality of the group call.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments.

For example, some cellular PTT systems allow a user to create ad-hoc group member lists for the sake of a specific group call. In this case, the secure group PTT call channel is set up exclusively for and the encrypted voice packets are sent only to the members on the ad hoc list. Here, a given user has a fixed set of potential group members, and the network is aware of every potential group member. Potential group members may be placed in at least one subgroup. The subgroups can overlap. The group TEK server, which can be controlled by the user, provides different TEKs to potential group members in different sub-groups, but the encrypted voice is transmitted by the network to all potential group members. Only those potential group members designated as being within a particular sub-group have the TEK required to decrypt the encrypted voice.

In another embodiment, some cellular PTT systems allow only statically provisioned PTT group calls. In this case, encrypted voice packets are sent to all the PTT group members. The static group members who have not received the group TEK mute the audio when receiving encrypted voice (due to detecting and processing the cryptographic sync management message in the voice data). In this way, a virtual secure ad-hoc group PTT call is established on the larger statically defined group PTT channel. Multiple separate secure ad-hoc group PTT calls can be multiplexed onto the single larger statically defined group call channel, allowing for a greater number of distinct ad-hoc secure PTT groups.

It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A secure group communication method for a wireless dispatch system comprising a group of members, the group members comprising a first secure device which communicates with a plurality of second secure devices over a channel, comprising:
  creating a group member list comprising the first secure device and the plurality of second secure devices;
  generating a group traffic encryption key at the first secure device;
  establishing, responsive to a first secure call request from the first secure device, a unique key encryption key at the first secure device for each of the plurality of second secure devices, wherein each unique key encryption key is generated via an asymmetric key exchange between the first secure device and each of the plurality of second secure devices during a first session, wherein each unique key encryption key has a corresponding unique private key which corresponds to the unique key encryption key for that particular second device;
  generating a unique state vector for each of the plurality of second secure devices at the first secure device, wherein the first secure device also has a first unique state vector, and wherein each unique state vector corresponds to a particular one of the plurality of second secure devices;
  sending the group member list, the unique state vectors and the group traffic encryption key to each of the plurality of second secure devices;
  storing the group traffic encryption key in the secure devices of the group members for use during a second session between the group members to expedite group traffic encryption key establishment during call set-up of the second session; and
  establishing, responsive to a second secure call request from the secure device of one of the group members, the second session between the group members by using the group traffic encryption key from the first session and the unique state vector of each of the secure devices to establish the second session during call set-up of the second session.

2. The method of claim 1, further comprising:
  encrypting the group member list, the group traffic encryption key and each unique state vector for each of the particular second secure device using the corresponding unique key encryption keys of each of the particular second secure devices to generate a unique encrypted message for each of the plurality of second secure devices, wherein each unique encrypted message corresponds to a particular one of the second secure devices.

3. The method of claim 2, further comprising:
  sending each of the unique encrypted message to the particular second secure device that unique encrypted message corresponds to; and
  decrypting each unique encrypted message at the corresponding particular one of the second secure devices, wherein each of the particular second secure devices uses the corresponding unique private key which corresponds to the unique key encryption key of that particular second secure device to decrypt the unique encrypted message of that particular second secure device to generate the group member list, the group traffic encryption key and the unique state vector for that particular second secure device.

4. The method of claim 3, further comprising:
    using the stored group traffic encryption key and the unique state vector to encrypt voice packets being sent from the secure device of one group member to the secure devices of the other group members.
5. The method of claim 4, wherein using the stored group traffic encryption key to encrypt voice packets, comprises:
    using stored group traffic encryption key and the first unique state vector of the first secure device to encrypt voice packets being sent from the first secure device over the channel to the plurality of second secure devices.
6. The method of claim 5, further comprising:
    using the stored group traffic encryption key and the first unique state vector to decrypt voice packets received by the second secure devices.
7. The method of claim 1, wherein the asymmetric key exchange is triggered by a secure group PTT call request and wherein the asymmetric key exchange takes place over a reliable network transport service.
8. The method of claim 1, wherein the asymmetric key exchange takes place over the channel by packing the data into voice frames.
9. The method of claim 1, wherein the asymmetric key exchange is initiated in advance of a PTT call when a client number/identifier of at least one of the plurality of second secure devices is entered in a secure PTT call phone book directory of the first secure device.
10. The method of claim 1, wherein the asymmetric key exchange is initiated in advance of a PTT call when the first secure device selects at least one of the second secure devices listed in an address book of the first secure device as being authorized for secure group PTT calls, and wherein the first secure device calls the selected secure devices while the first secure device is idle to establish the unique key encryption keys via an asymmetric key exchange before the first secure device attempts a secure group PTT call to the selected secure devices.
11. The method of claim 1, further comprising:
    updating the unique key encryption keys in advance of a second secure group PTT call using network signaling when the first secure device is in an idle state.
12. The method of claim 1, further comprising:
    updating the unique key encryption keys in advance of the second secure PTT call using IP network transport when the first secure device is in an idle state.
13. The method of claim 1, further comprising:
    deterministically updating each of the unique key encryption keys to generate an updated unique key encryption keys prior to the second secure group PTT call request by running an identical algorithm in both the first secure device and the plurality of second secure devices to compute the updated unique key encryption keys from the original unique key encryption keys.
14. A secure device configured to communicate with a plurality of second secure devices over a channel in a secure wireless dispatch system comprising a group of members, the secure device comprising:
    a processor configured to: create a group member list comprising the first secure device and the plurality of second secure devices, generate a group traffic encryption key for the group members, conduct an asymmetric key exchange during a first session with each of the plurality of second secure devices to establish a unique key encryption key for each of the plurality of second secure devices, wherein each unique key encryption key has a corresponding unique private key for that particular second device; and
    a vector generator configured to generate a unique state vector for each of the plurality of second secure devices, wherein each unique state vector corresponds to a particular one of the plurality of second secure devices; and
    a transceiver configured to send the group member list, the unique state vectors and the group traffic encryption key to each of the plurality of second secure devices.
15. The secure device of claim 14, further comprising:
    an encryption engine configured to encrypt the group member list, the group traffic encryption key and each unique state vector for each of the particular second secure devices using the corresponding unique key encryption keys of each of the particular second secure devices to generate a unique encrypted message for each of the plurality of second secure devices, wherein each unique encrypted message corresponds to a particular one of the second secure devices.
16. The secure device of claim 15, wherein the transceiver is configured to send each of the unique encrypted messages to the particular second secure device that unique encrypted message corresponds to.
17. The secure device of claim 14, wherein a second session is established between the group members responsive to a second secure group PTT call request from the secure device of one of the group members by using the group traffic encryption key from the first session and the unique state vector of each of the other secure devices of the other group members.
18. The secure device of claim 17, wherein the first secure device comprises:
    a vocoder configured to generate voice packets from a voice signal, wherein the encryption engine of the secure device of the one group members uses the stored group traffic encryption key and the unique state vector to encrypt voice packets being sent to the other secure devices of the other group members over the channel.
19. The secure device of claim 17, wherein the first secure device comprises:
    a modem configured to format the encrypted voice packets to fit within the channel; and
    a first transceiver configured to transmit the formatted voice packets.
20. The system of claim 19, wherein the updated state vector comprises a synchronization message, and wherein the state vector generator, comprises:
    a synchronization message generator configured to generate the synchronization message for maintaining secure call synchronization, and
    wherein the modem further comprises:
        a synchronization message insertion unit configured to replace at least part of at least one of the encrypted voice packets being sent from the encryption engine with the synchronization message.
21. A secure device configured to communicate over a half-duplex voice channel, the secure device comprising:
    a cache memory for storing: a group member list that identifies a group of secure devices including the secure device and a transmitting secure device, a first unique state vector for the secure device, and a group traffic encryption key corresponding to the group member list and being for use during a subsequent group communication session;
    a transceiver configured to receive, from the transmitting secure device over the half-duplex voice channel during the subsequent group communication session, periodic synchronization messages and encrypted voice packets, wherein each of the periodic synchronization messages comprise: a second unique state vector of the transmitting secure device, wherein each second unique state vector is used to encrypt at least one of the encrypted data packets; and a decryption engine designed to: store a value equal to a current second unique state vector from a current synchronization message; retrieve the cached group traffic encryption key; and use the value and the cached group traffic encryption key to generate a unique key that is used to decrypt at least one of the encrypted voice packets.

22. The secure device of claim 21, wherein the decryption engine comprises:

a synchronization message detector designed to receive the half-duplex voice channel, and to detect and output the current second unique state vector from the current synchronization message;

a counter, coupled to the synchronization message detector, and designed to store and output a value equal to the current second unique state vector provided from the synchronization message detector;

an encryption unit, coupled to the counter, designed to receive the value and the cached group traffic encryption key from the cache memory, and to generate the unique key based on the value and the cached group traffic encryption key; and an exclusive OR function designed to receive the encrypted voice packets from the synchronization message detector and the unique key from the encryption unit, and to decrypt at least one of the encrypted voice packets by performing an exclusive OR operation on the encrypted voice packets and the unique key.

23. The secure device of claim 22, wherein the synchronization message detector is further designed to:

receive the voice channel and to detect and output: the current second unique state vector from the current synchronization message and a subsequent second unique state vector from subsequent synchronization message, and wherein the counter is further designed to:

receive the current second unique state vector;

set the value to an initial value of the current second unique state vector to cryptographically synchronize the secure device and the transmitting secure device;

increment the value each time one of the encrypted voice packets is received to generate a current value of the counter;

receive the subsequent second unique state vector;

compare the subsequent second unique state vector to the current value of the counter; and when the subsequent second unique state vector is not equal to the current value of the counter, update the current value to an updated value that is equal to the subsequent second unique state vector to ensure that cryptographic synchronization is maintained between the transmitting secure device and the secure device.

24. The secure device of claim 23, wherein each of the second unique state vectors from each synchronization message are used to maintain cryptographic synchronization between the transmitting secure device and the secure device, and comprise:

a synchronization message frame pseudorandom number.

25. The secure device of claim 24, wherein the group traffic encryption key corresponding to the group member list is used during the subsequent group communication session to expedite group traffic encryption key establishment during call set-up of the subsequent group communication session.

* * * * *

UNITED STATES PATENT AND TRADEMARK OFFICE
CERTIFICATE OF CORRECTION

PATENT NO. : 7,643,817 B2  Page 1 of 1
APPLICATION NO. : 11/132643
DATED : January 5, 2010
INVENTOR(S) : Klug et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Sixteenth Day of November, 2010

David J. Kappos
*Director of the United States Patent and Trademark Office*